(12) United States Patent
Smullin

(10) Patent No.: US 6,273,772 B1
(45) Date of Patent: Aug. 14, 2001

(54) APPARATUS AND METHOD FOR MULTI-CONDUIT WATERLIFT ENGINE SILENCING

(75) Inventor: Joseph I. Smullin, Swampscott, MA (US)

(73) Assignee: Smullin Corporation, Marblehead, MA (US)

( * ) Notice: Subject to any disclaimer, the term of this patent is extended or adjusted under 35 U.S.C. 154(b) by 0 days.

(21) Appl. No.: 09/349,871

(22) Filed: Jul. 8, 1999

(51) Int. Cl.[7] .............. B63H 21/32; F01N 1/14; F02K 1/00

(52) U.S. Cl. .............. 440/89; 181/220; 181/260

(58) Field of Search .............. 440/88, 89; 181/220, 181/226, 238, 259, 260; 60/317

(56) References Cited

U.S. PATENT DOCUMENTS

| | | |
|---|---|---|
| 784,833 | 3/1905 | Brush . |
| 1,015,955 | 1/1912 | Helder . |
| 1,065,707 | 6/1913 | Montgomery . |
| 1,076,571 | 10/1913 | Hall, Jr. . |
| 1,127,807 | 2/1915 | Perkins . |
| 1,759,679 | 5/1930 | Backman . |
| 1,816,371 * | 7/1931 | Hefti .................. 440/89 |
| 2,360,429 | 10/1944 | Leadbetter . |
| 2,498,979 | 2/1950 | Bourne . |
| 2,961,059 | 11/1960 | Blair . |
| 3,291,252 | 12/1966 | Davis . |
| 3,296,997 | 1/1967 | Hoiby et al. . |
| 3,431,882 | 3/1969 | Irgens . |
| 4,184,566 | 1/1980 | Baker et al. .................. 181/261 |
| 4,310,067 | 1/1982 | Thomson . |
| 4,416,350 | 11/1983 | Hayashi .................. 181/272 |
| 4,601,666 * | 7/1986 | Wood, Jr. .................. 440/89 |
| 4,678,442 * | 7/1987 | Nishida et al. .................. 440/89 |
| 4,713,029 | 12/1987 | Ford .................. 440/89 |
| 4,917,640 | 4/1990 | Miles, Jr. .................. 440/89 |
| 5,041,036 * | 8/1991 | Clark et al. .................. 440/89 |
| 5,045,005 | 9/1991 | Miles, Jr. .................. 440/89 |
| 5,147,232 | 9/1992 | Miles, Jr. et al. .................. 440/89 |
| 5,259,797 | 11/1993 | Miles, Jr. et al. .................. 440/89 |
| 5,554,058 | 9/1996 | LeQuire .................. 440/89 |
| 5,588,888 | 12/1996 | Magharious .................. 440/89 |
| 5,594,217 | 1/1997 | Lequire . |
| 5,625,173 | 4/1997 | Woods .................. 181/227 |
| 6,045,422 * | 4/2000 | Widmann .................. 440/89 |

FOREIGN PATENT DOCUMENTS 344735   3/1931   (GB) .

* cited by examiner

Primary Examiner—S. Joseph Morano
Assistant Examiner—Andrew Wright
(74) Attorney, Agent, or Firm—Wolf, Greenfield & Sacks, P.C.

(57) ABSTRACT

A waterlift silencer and method for reducing the acoustic energy of a fluid mixture of engine exhaust gas and a liquid coolant and limiting back pressure exerted by the silencer on an engine, particularly as applied to engines located below the waterline of a marine vessel. The silencer has two or more mixture-expelling conduits through which the fluid mixture is dynamically lifted above the silencer to a point above the waterline. The mixture-expelling conduits are sequentially operated in order to maintain exhaust gas volume flow rates high enough to partially atomize the liquid and thus allow it to be expelled upward, while maintaining a minimal back pressure on the engine throughout the full range of normal engine operating speeds. Two mixture-expelling tubes may be used. The first tube typically has a diameter that is equal to or smaller than the diameter of the second tube, and has an opening in its bottom portion that is further from the bottom of the holding chamber than is an opening in the bottom portion of the second tube. When the engine is started, the pressure in the holding chamber pushes the free water level of the fluid mixture down to the opening in the first tube, which may thus dynamically lift the fluid mixture out of the chamber. As the engine speed increases, the free water level reaches the opening in the second tube, so that the fluid mixture is carried out through both tubes. The first tube may be located within the second tube.

71 Claims, 13 Drawing Sheets

APPARATUS AND METHOD FOR MULTI-CONDUIT WATERLIFT ENGINE SILENCING

BACKGROUND OF THE INVENTION

1. Field of The Invention

The present invention relates generally to devices and methods for silencing engines and, more particularly, to silencers for engines used in a marine environment that employ water cooling of the exhaust gas.

1. Related Art

One technique for silencing engines, particularly those used in a marine environment, is to add water (usually the engine cooling water) to the engine's exhaust gas. Typical applications are marine propulsion engines and electric generators for use in a marine environment. Discharge of the resulting mixture of exhaust gas and water is straightforward in applications in which the engine is situated above the waterline. In these cases, the water and gas mixture may simply be downwardly directed through a pipe for discharge through the vessel's hull. The downward angling of the pipe is provided so that water does not flow back through the pipe and into the engine.

However, in some applications the engine is located below the waterline, such as in some sailboats or displacement power boats. In those applications in which water is not mixed with the exhaust gas, and thus the cooling and silencing benefits of mixing with water are foregone, the hot gas may simply be directed upward and discharged above the waterline. Typically, before discharge, the hot gas is silenced by a device that may be similar to an automotive muffler. In those applications in which water is mixed with the exhaust gas at the engine, the resulting mixture must be lifted above the waterline and then directed downward for discharge through the hull. The vertical distance that the mixture must be lifted may vary between a few inches to ten feet or more.

A device commonly referred to as a "waterlift silencer" has been developed to cool and silence the exhaust gas and to lift the mixture of exhaust gas and water above the waterline. In a waterlift silencer, the mixture is introduced into a chamber (or series of chambers). The expansion of the mixture into the volume of the chamber reduces the acoustic energy of the exhaust. An exit tube conventionally is provided through which the mixture is expelled from the chamber.

One such conventional waterlift silencer is described in U.S. Pat. No. 3,296,997 to Hoiby, et. al. In the Hoiby device, the mixture of cooling water and exhaust gas is introduced into a chamber through an inlet pipe. An exit tube extends vertically through the top of the chamber. The bottom of the exit tube is spaced from the bottom of the chamber so that the mixture may enter the bottom of the tube and be expelled. As described by Hoiby, the gas separates from the water in the chamber and, when the dynamic pressure in the chamber is such as to depress the water level to the bottom of the tube, the gas escapes in a high velocity flow through the bottom of the tube and out of the chamber. The kinetic energy of the gas escaping through the tube partially atomizes the water, according to Hoiby, and entrains the atomized liquid particles. The entrained liquid is thus carried, along with the exhaust gas, up through the exit tube. A similar design is shown in U.S. Pat. No. 5,554,058 to LeQuire.

U.S. Pat. No. 2,360,429 to Leadbetter is one type of silencer that uses water to silence exhaust gas and includes multiple chambers. Other designs of marine silencers employing water silencing using multiple chambers are described in U.S. Pat. No. 5,147,232 to Miles, et al. (including a list of patents related to silencers for marine engines; see column 1). In the silencers described in Miles, multiple intermediate exhaust tubes are provided for carrying exhaust gas between chambers, and multiple outlet exhaust passageways are provided for expelling exhaust gas from the silencer. The silencer described in U.S. Pat. No. 2,498,979 to Bourne also shows multiple chambers and multiple pipes for expelling exhaust gas.

SUMMARY OF THE INVENTION

In some embodiments, the present invention is a waterlift silencer for reducing the acoustic energy of a fluid mixture of exhaust gas and a liquid coolant, and for expelling the mixture from above the silencer. These embodiments are particularly well suited for limiting back pressure in applications in which the exhaust gas flow rate may vary, as it typically does with engine speed. Often, the exhaust gas is produced by a marine engine or a generator used in a marine environment, but the source of the exhaust gas may be any of a variety of devices. For convenience, reference hereafter often is made to the speed of an engine, back pressure exerted on an engine, and so on. It will be understood, however, that the word "engine" is used broadly to refer to any device generating the exhaust gas operated upon by the waterlift silencer.

The waterlift silencer of these embodiments includes a holding chamber that holds the fluid mixture. The silencer also has first and second first mixture-expelling conduits, each of which has a bottom portion disposed within the holding chamber. The fluid mixture may be dynamically lifted out of the holding chamber and silencer through the conduits so that, typically, the mixture may be expelled from a point above the waterline. Thus, a usual application is one in which an engine is located below the waterline of a marine vessel. Also included in the waterlift silencer are means for sequentially operating the first and second mixture-expelling conduits.

The word "dynamic," and grammatical variants thereof, are used in this context to mean that the fluid mixture, in a partially atomized state, is lifted up into a mixture-expelling conduit due to dynamic effects, as further described below. Even when these dynamic effects are not present, the fluid mixture may nonetheless rise to a certain level in the conduit as determined by the static pressure in the holding chamber. The fluid mixture may even be forced to flow through the conduit if the static pressure is high enough. In these cases, however, fluid droplets typically are not partially atomized, and the flow is substantially due to static effects. In contrast, dynamic lifting occurs when the velocity of the exhaust gas at the bottom opening of a conduit is high enough to partially atomize fluid droplets and entrain them in the flow. Dynamic effects at the inlet of the conduit determine the water level that the fluid mixture will reach in this partially atomized state such that, if the exhaust gas flow velocity is high enough, the fluid mixture is lifted up and flows through the conduit. Thus, the fluid mixture may be lifted above the silencer so that, for example, it may be expelled above the waterline in a marine environment. As noted below, the flow velocity of the exhaust gas generally is directly proportional to the exhaust gas volume flow rate into the holding chamber, which generally increases with increasing engine speed. Thus, the fluid mixture will be dynamically lifted upward and out of the holding chamber and the silencer in a partially atomized state at sufficiently high engine speeds, i.e., when the exhaust gas volume flow rate is high enough to create dynamic effects at the inlet of a conduit. Under these conditions, a mixture-expelling conduit may be referred to herein as being "dynamically operative."

Typically as used herein, the phrase "sequentially operating," and grammatical variants thereof, mean that first a first mixture-expelling conduit is dynamically operative, then a second mixture-expelling conduit is dynamically operative while the first mixture-expelling conduit may or may not continue to be dynamically operative. If additional mixture-expelling conduits are present in an embodiment, then a third mixture-expelling conduit is dynamically operative while both the first and second mixture-expelling conduits may or may not continue to be dynamically operative, and so on. Most generally, mixture-expelling conduits that are described herein as being sequentially operative may illustratively be assumed to be not exclusively dynamically operative. However, in some implementations, mixture-expelling conduits may be exclusively dynamically operative, e.g., a first conduit may be dynamically operative and, at the time (or at some time before or after) a second conduit is dynamically operative, the first conduit may not be dynamically operative. Also, there may be a combination of exclusively and non-exclusively dynamically operative conduits, or conduits may be exclusively dynamically operative over a range of some operational characteristics and non-exclusively dynamically operative over another range of those, or other, operational characteristics. For example, a first conduit may be dynamically operative, then a second conduit may be dynamically operative and the first conduit not dynamically operative, then a third conduit may be dynamically operative while the second conduit remains not dynamically operative, a fourth conduit may be dynamically operative while the third conduit remains dynamically operative but the second conduit is not dynamically operative, and so on. As described below, these various combinations and permutations may be implemented, together with combinations and permutations of conduit cross-sectional area (i.e., area in a plane perpendicular to the longitudinal axis of the conduit) and/or height of a first opening in the conduits above the bottom of the holding chamber, in order to provide various performance characteristics with respect to back pressure as a function of gas volume flow rate.

In particular, the sequential operation of two conduits (and sequential operation of additional conduits in other embodiments) is an advantageous feature of the present invention because it allows the dynamic gas pressure in the holding chamber to be maintained within a predetermined range over a range of volume flow rates of the exhaust gas through the silencer. The dynamic gas pressure in the holding chamber generally is directly related to the back pressure exerted on the engine. In order to force the fluid mixture to rise continuously to the required height in a partially atomized state, a certain minimum gas flow velocity must be maintained in the operative conduit or conduits. The flow velocity of the exhaust gas is equal to the rate of exhaust volume produced, divided by the combined cross-sectional areas of the two (or more) conduits that are dynamically operative. The rate of exhaust gas volume produced is related to the engine speed and power.

In conventional waterlift silencers, a problem is encountered because the dynamic gas pressure in the silencer may be excessive under certain operating conditions, in particular, at certain engine speeds. As noted, dynamic pressure in the silencer results in back pressure exerted on the engine. Excessive back pressure may adversely affect engine performance, and may even damage the engine. In conventional waterlift silencers, such as the one described in U.S. Pat. No. 3,296,997 to Hoiby, et al., noted above, excessive back pressure may develop at low engine speeds, such as when the engine is idling. This problem pertains notwithstanding the assertion in Hoiby that its design, employing a single mixture-expelling conduit, provides a "constantly low and reasonably uniform back pressure" at all engine speeds (at column 3, lines 53–57). The reason for the problem is that, if the gas flow velocity is not above a certain value determined largely by the quantity of liquid coolant, but also determined by the height of the mixture-expelling conduit and other factors, then the fluid mixture may fill the mixture-expelling conduit rather than being expelled as a partially atomized mixture, thus causing excessive back pressure.

In order to avoid excessive back pressure, the gas flow velocity may be modified so that it is maintained at an acceptably high value at low engine speeds. This modification may be accomplished by adjusting the cross-sectional area of the mixture-expelling conduit. However, adjusting the gas flow velocity to reduce back pressure at low-speed operation may present problems in conventional waterlift silencers. In particular, excessive back pressure may develop due to the higher gas flow velocity when the engine is operated at higher speeds. This problem of avoiding excessive back pressure at the low and high ranges of engine operation may be particularly difficult with respect to certain types of engines. For example, propulsion engines having turbochargers may operate with gas volume flow rates at low or idle speed that range as low as ten percent of the gas volume flow rates at full power. Conventional devices generally do not address, much less resolve, this problem of avoiding excessive back pressure within a potentially large range of gas volume flow rates between start-up of the engine (and low-speed operation such as engine idling) and full-power engine operation.

One embodiment of the invention addresses this problems by providing means for sequentially operating two or more mixture-expulsion conduits. In one implementation of this embodiment, the means for sequential operation is constructed and arranged so that the first mixture-expelling conduit is dynamically operative when the engine is operated within a first range of operating speeds. The second mixture-expelling conduit is dynamically operative when the engine is operated within a second range of operating speeds having a threshold speed below which the second mixture-expelling conduit is not dynamically operative. The second range of operating speeds is, in some aspects of this implementation, a subset of the first range of operating speeds. Also, the first and second ranges may be substantially coextensive above the second threshold speed.

In some implementations, the first and second mixture-expelling conduits each has an opening in its bottom portion. The means for sequentially operating may be constructed and arranged in these implementations so that the first mixture-expelling conduit is dynamically operative when the exhaust gas has a velocity at the opening of the first mixture-expelling conduit within a first range of exhaust gas flow velocities. The second mixture-expelling conduit is dynamically operative when the exhaust gas has a velocity at the opening of the first mixture-expelling conduit within a second range of exhaust gas flow velocities including a threshold velocity below which the second mixture-expelling conduit is not dynamically operative.

In another implementation, the means for sequential operation is constructed and arranged so that the first mixture-expelling conduit is dynamically operative when the exhaust gas volume flow rate is within a first range of flow rates. The second mixture-expelling conduit is operative when the exhaust gas enters the holding chamber having an exhaust gas volume flow rate within a second range of flow rates including a threshold rate below which the second mixture-expelling conduit is not operative. The second range of exhaust gas volume flow rates may be a subset of the first range of exhaust gas volume flow rates, and the first and second ranges may be substantially coextensive above the threshold exhaust gas volume flow rate.

The means for sequentially operating may alternatively be constructed and arranged so that the first mixture-expelling conduit is dynamically operative within a first range of static gas pressures in the holding chamber. The second mixture-expelling conduit is operative within a second range of static gas pressures in the holding chamber, including a threshold static gas pressure below which the second mixture-expelling conduit is not operative. In some aspects, the second range of static gas pressures is a subset of the first range of static gas pressures, and the first and second ranges may be substantially coextensive above the threshold dynamic gas pressure.

The means for sequentially operating may also be constructed and arranged so that the first mixture-expelling conduit is dynamically operative within a first range of dynamic gas pressures at an opening in the bottom portion of the first mixture-expelling conduit. The second mixture-expelling conduit is operative within a second range of dynamic gas pressures at the opening in the bottom portion of the first mixture-expelling conduit, including a threshold dynamic gas pressure below which the second mixture-expelling conduit is not operative. In some aspects, the second range of static gas pressures is a subset of the first range of static gas pressures, and the first and second ranges may be substantially coextensive above the threshold dynamic gas pressure.

In yet another implementation, the means for sequentially operating is constructed and arranged so that the first mixture-expelling conduit is dynamically operative when a first range of back pressure is present at the engine. The second mixture-expelling conduit is operative when a second range of back pressure is present at the engine, including a threshold back pressure below which the second mixture-expelling conduit is not operative. The second range of back pressures may be a subset of the first range of back pressures, and the first and second ranges may be substantially coextensive above the second threshold back pressure.

Also, the means for sequentially operating may be constructed and arranged so that the first mixture-expelling conduit is dynamically operative in response to combined effects of a first group of two or more sets of values of liquid coolant volume flow rate and exhaust gas volume flow rate into the holding chamber. The second mixture-expelling conduit is dynamically operative in response to combined effects of a second group of two or more sets of values of liquid coolant volume flow rate and exhaust gas volume flow rate into the holding chamber. At least one of the first sets of values is not the same as any of the second sets of values, and at least one of the second sets of values is the same as one of the first sets of values.

In a further implementation, the means for sequentially operating is constructed and arranged so that the first mixture-expelling conduit is dynamically operative when the fluid mixture has a free-surface height above the bottom of the holding chamber that is within a first range of heights. The second mixture-expelling conduit is operative when the fluid mixture has a free-surface height above the bottom of the holding chamber that is within a second range of heights including a threshold height above which the second mixture-expelling conduit is not operative. In some aspects, the second range of heights is a subset of the first range of heights. The first and second ranges may be substantially coextensive below the second threshold height.

One or more additional mixture-expelling conduits, in addition to the first and second mixture-expelling conduits, may also be provided. Each is constructed and adapted to dynamically lift the fluid mixture above the silencer and has a bottom portion disposed within the holding chamber. Also included are means for sequential operation of the additional mixture-expelling conduits to expel the fluid mixture from the holding chamber when the first and second mixture-expelling conduits are dynamically operative.

In another embodiment, the invention is a waterlift silencer for reducing the acoustic energy of a fluid mixture of exhaust gas from an engine and a liquid coolant. The silencer includes a holding chamber that holds the fluid mixture; a first mixture-expelling conduit for dynamically lifting the fluid mixture above the silencer, the first mixture-expelling conduit having a bottom portion disposed within the holding chamber; and a second mixture-expelling conduit for dynamically lifting the fluid mixture above the silencer, the second mixture-expelling conduit having a bottom portion disposed within the holding chamber. In this embodiment, the first mixture-expelling conduit has a first opening in its bottom portion that is disposed at least at a first height above the bottom surface of the holding chamber, wherein the first height is the greatest height of any height of the first opening of the first mixture-expelling conduit above the bottom surface of the holding chamber. The second mixture-expelling conduit has a first opening in its bottom portion that is disposed at least at a second height above the bottom surface of the holding chamber, wherein the second height is the greatest height of any height of the first opening of the second mixture-expelling conduit above the bottom surface of the holding chamber. The first height is greater than the second height.

In one implementation of this embodiment, the bottom portion of the first mixture-expelling conduit has a cross-sectional area, and the bottom portion of the second mixture-expelling conduit has a cross-sectional area that is greater than the cross-sectional area of the bottom portion of the first mixture-expelling conduit. In some implementations, however, the cross-sectional areas could be substantially the same.

Advantageously, this two-conduit implementation (or multi-conduit implementation in other aspects of the invention) enables greater silencing at low engine speed than typically is achieved by conventional devices in which only one mixture-expelling conduit is used. The greater silencing is possible because, as noted above and described in greater detail below, the sequential operation of first the conduit with the smaller cross-sectional area (e.g., typically a pipe with a smaller diameter), and then the second conduit with a greater cross-sectional area (e.g., pipe with greater diameter), maintains the back pressure exerted by the silencer on the engine within an acceptable operating range for all operating values of engine speed (or gas-flow velocity). In particular, at low engine speeds, the first conduit is operative and this conduit, because of the sequential operation feature that controls back pressure, may be significantly narrower (smaller cross-sectional area) than could a single conduit in a conventional device. That is, the conventional device typically must have a larger conduit in order to avoid excessive back pressure at low engine speeds. However, the amount of acoustic energy reflected back to the engine generally increases as the size of the conduit decreases. Thus, the smaller first conduit of this implementation of the invention reflects more of the acoustic energy back to the engine than would a larger, single, conduit used in a conventional device. For this reason, the use of sequential operation so that a smaller first conduit may be used at low engine speeds improves silencing at low engine speeds. This improved silencing performance applies irrespective of whether it is necessary or desirable to lift the fluid mixture, and thus the present invention provides advantages even if fluid lifting is not an objective of the silencer.

In the present implementation, the bottom portion of the first mixture-expelling conduit may be disposed within the bottom portion of the second mixture-expelling conduit. In some aspects, the first mixture-expelling conduit may be disposed within the second mixture-expelling conduit. Also, in some aspects, the second mixture-expelling conduit has a second opening in its bottom portion, and the silencer further includes an interior-connecting conduit that passes through the second opening and has a first end fluidly connected to the first opening of the first mixture-expelling conduit and a second end disposed outside of the second mixture-expelling conduit and within the holding chamber. The interior-connecting conduit is sealed with respect to the second opening so that the fluid mixture does not substantially enter the second mixture-expelling conduit through the second opening.

The bottom portion of the first mixture-expelling conduit may, in some implementations, have an open bottom end that includes the first opening of the first mixture-expelling conduit. Also, the bottom portion of the second mixture-expelling conduit may have an open bottom end that includes the first opening of the second mixture-expelling conduit. Moreover, the first and second heights may be predetermined so that, at a first operating speed of the engine, the fluid mixture has a first free-surface height above the bottom surface of the holding chamber that is not higher than the first height and is higher than the second height. At a second operating speed of the engine, the fluid mixture has a second free-surface height above the bottom surface of the holding chamber that is lower than or substantially equal to the second height The second operating speed is greater than the first operating speed. In some aspects, the first opening of the first mixture-expelling conduit includes at least one slot that extends downward from the first height to a third height above the bottom of the holding chamber. The third height is less than the second height. In some implementations, the first mixture-expelling conduit is dynamically operative to expel the fluid mixture when the engine is operated above a first engine speed. The second mixture-expelling conduit is operative to expel the fluid mixture only when the engine is operated above a second engine speed greater than the first engine speed. Also, the silencer may include a third mixture-expelling conduit disposed at least in part within the holding chamber for dynamically lifting the fluid mixture above the silencer. The third mixture-expelling conduit is operative to expel the fluid mixture only when the engine is operated above a third engine speed. The third engine speed is greater than the second engine speed.

In some embodiments, the invention is a silencer assembly that includes a waterlift silencer and a secondary silencer. The secondary silencer has at least one inflow port fluidly connected to the first and/or second mixture-expelling conduits for receiving the fluid mixture from the first and second mixture-expelling conduits. The secondary silencer also has silencing means to further reduce the acoustic energy of the fluid mixture, and at least one outflow port through which the fluid mixture is expelled from the secondary silencer.

In some embodiments, the invention is a separator-silencer assembly that includes a waterlift silencer and a separator-silencer. The separator-silencer has at least one inflow port fluidly connected to the first and/or second mixture-expelling conduits for receiving the fluid mixture from the first and second mixture-expelling conduits. The separator-silencer also has separating means to substantially separate the exhaust gas and the liquid coolant from the fluid mixture, silencing means to further reduce the acoustic energy of the separated exhaust gas, recombining means to recombine the separated exhaust gas and liquid coolant, and at least one outflow port through which the recombined exhaust gas and liquid coolant are expelled from the separator-silencer.

In other embodiments, the invention is a separator-silencer assembly that includes a waterlift silencer and another implementation of a separator-silencer. The separator-silencer of this embodiment includes at least one inflow port fluidly connected to the first and/or second mixture-expelling conduits for receiving the fluid mixture from the first and second mixture-expelling conduits. Also included are separating means to substantially separate the exhaust gas and the liquid coolant from the fluid mixture, silencing means to further reduce the acoustic energy of the separated exhaust gas, an exhaust-gas outflow port through which the separated exhaust gas is expelled from the separator, and a coolant outflow port through which the separated liquid coolant is expelled from the separator-silencer.

In yet further embodiments, the invention is a silencer assembly that includes a waterlift silencer and a separator. The separator has at least one inflow port fluidly connected to the first and/or second mixture-expelling conduits for receiving the fluid mixture from the first and second mixture-expelling conduits. Also included in the separator are separating means to substantially separate the exhaust gas and the liquid coolant from the fluid mixture, an exhaust-gas outflow port through which the separated exhaust gas is expelled from the separator, and a coolant outflow port through which the separated liquid coolant is expelled from the separator.

In other embodiments, the invention is a waterlift-silenced engine assembly. The assembly includes an engine for operation in a marine environment having an exhaust gas outflow conduit for expelling exhaust gas, liquid coolant providing means for providing liquid coolant for mixing with the exhaust gas, and a waterlift silencer for reducing the acoustic energy of a fluid mixture of the exhaust gas and the liquid coolant. The waterlift silencer includes a holding chamber that holds the fluid mixture. The holding chamber has an exhaust gas inflow port gaseously connected to the exhaust gas outflow conduit for receiving the exhaust gas, and a liquid coolant inflow port fluidly connected to the liquid coolant providing means for receiving the liquid coolant. The waterlift silencer further includes a first mixture-expelling conduit disposed at least in part within the holding chamber for dynamically lifting the fluid mixture above the silencer; a second mixture-expelling conduit disposed at least in part within the holding chamber for dynamically lifting the fluid mixture above the silencer;

and means for sequentially operating the first and second mixture-expelling conduits. In some implementations, the engine has a turbocharger.

In yet farther embodiments, the invention is a waterlift-silenced engine assembly that has an engine for operation in a marine environment having an exhaust gas outflow conduit for expelling exhaust gas. The assembly also has liquid coolant mixing means for mixing liquid coolant with the exhaust gas to produce a fluid mixture of exhaust gas and liquid coolant, and a waterlift silencer for reducing the acoustic energy of the fluid mixture. The silencer includes a holding chamber that holds the fluid mixture, and a fluid mixture inflow port fluidly connected to the liquid coolant mixing means for receiving the fluid mixture. The silencer further includes a first mixture-expelling conduit disposed at least in part within the holding chamber for dynamically lifting the fluid mixture above the silencer, a second mixture-expelling conduit disposed at least in part within the holding chamber for dynamically lifting the fluid mixture above the silencer, and means for sequentially operating the first and second mixture-expelling conduits. The engine may include a turbocharger.

The invention, in another embodiment, is a method for reducing the acoustic energy of a fluid mixture of exhaust gas from an engine and a liquid coolant. The method includes the steps of: receiving the fluid mixture in a holding chamber having a bottom surface; dynamically lifting the fluid mixture above the silencer through a first mixture-expelling conduit disposed at least in part within the holding chamber; dynamically lifting the fluid mixture above the silencer through a second mixture-expelling conduit disposed at least in part within the holding chamber; and sequentially operating the first and second mixture-expelling conduits.

The invention also is a waterlift silencer that includes a holding chamber that holds the fluid mixture, and also includes two or more mixture-expelling conduits, which may be self-compensating. These conduits automatically provide a first total cross-sectional area for the passage of the fluid mixture within a first range of volume flow rates of the exhaust gas into the holding chamber, and a second total cross-sectional area for the passage of the fluid mixture within a second range of volume flow rates of the exhaust gas into the holding chamber. The first total cross-sectional area is less than the second total cross-sectional area, and the volume flow rates in the first range are lower than the volume flow rates in the second range. In one implementation, a certain number of the conduits are automatically operative for the passage of the fluid mixture through them based on the gas volume flow rate of the exhaust gas into the holding chamber. In one aspect of this implementation, that number increases as the flow rate increases.

In yet a further embodiment, the invention is a waterlift silencer for reducing the acoustic energy of a fluid mixture of exhaust gas from an engine and a liquid coolant. The silencer includes a holding chamber that holds the fluid mixture; a first mixture-expelling conduit for expelling the fluid mixture from the holding chamber; a second mixture-expelling conduit for expelling the fluid mixture from the holding chamber; and means for sequentially operating the first and second mixture-expelling conduits. The first and second mixture-expelling conduits have bottom portions disposed within the holding chamber.

A number of embodiments of the invention thus are possible, along with different implementations and/or aspects that may be included in each of the summarized embodiments. It should be understood that the embodiments, implementations, and/or aspects are not necessarily inclusive or exclusive of each other and may be combined in any manner that is non-conflicting and otherwise possible. It should also be understood that these embodiments, implementations, and/or aspects of the invention are exemplary only and are considered to be non-limiting.

As noted above, the present invention provides numerous advantages. Various embodiments of the present invention provide certain advantages and overcome certain drawbacks of conventional techniques while other embodiments provide the same or different advantages and overcome the same or other drawbacks in the same or different manner. Thus, not all embodiments of the invention share the same advantages and those that do may not share them under all circumstances.

The above inventions may be employed singly or in combination. The description of one embodiment is not intended to be limiting with respect to other embodiments.

BRIEF DESCRIPTION OF THE DRAWINGS

The above and further advantages of the invention will be more clearly appreciated from the following detailed description when taken in conjunction with the accompanying drawings, in which like reference numerals indicate like structures or method steps, in which the leftmost (i.e., most significant) digit of a reference numeral indicates the number of the figure in which the referenced element first appears (for example, element 110 first appears in FIG. 1), and wherein.

DETAILED DESCRIPTION

Figure 1:
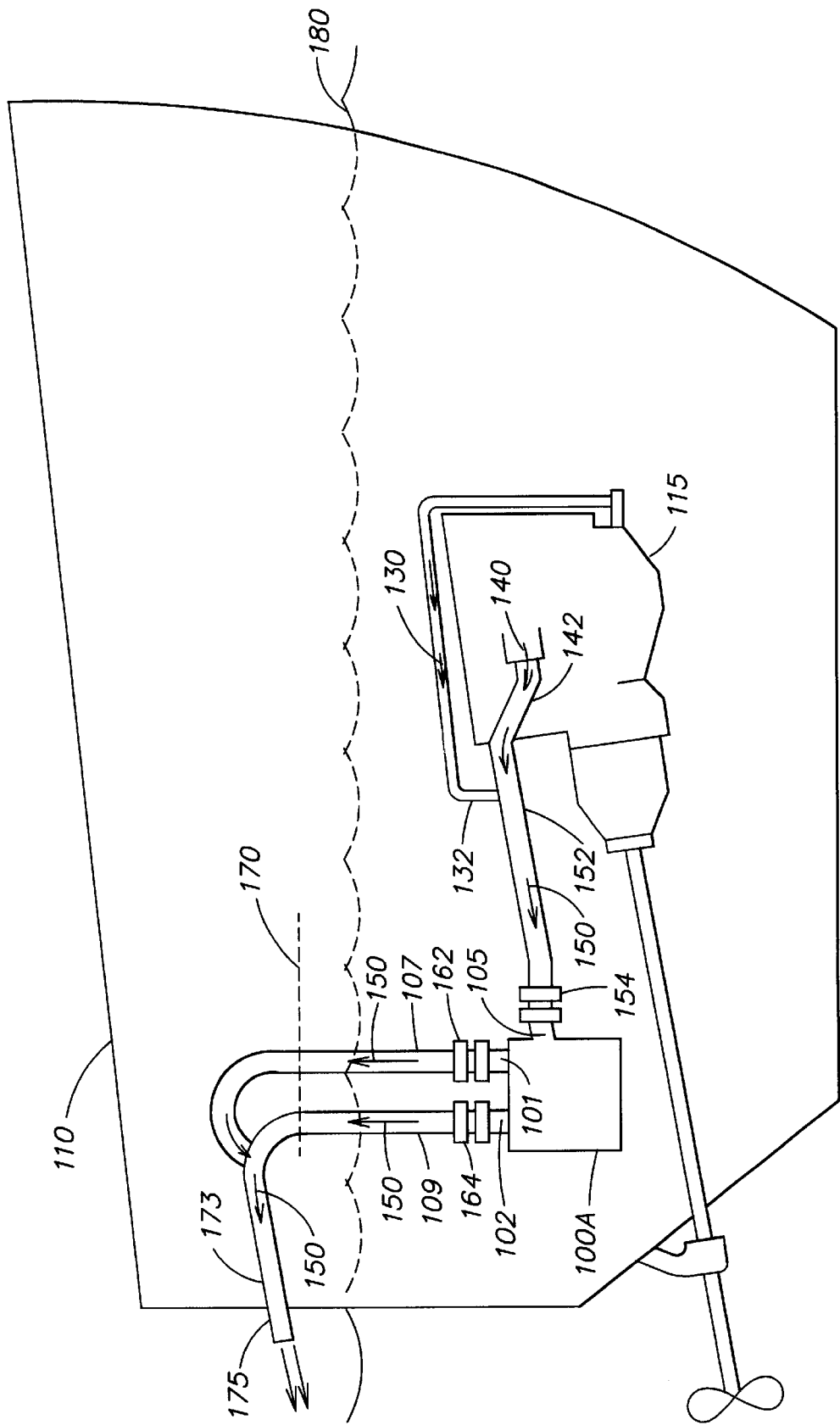
FIG. 1 is a schematic representation of one embodiment of a waterlift silencer of the present invention in an exemplary application in which it is disposed below the waterline of an illustrative marine vessel.

The attributes of the present invention and its underlying method and architecture will now be described in greater detail with reference to various exemplary embodiments of the invention, generally and collectively referred to as waterlift silencers 100. FIG. 1 is a schematic representation of one embodiment referred to as a waterlift silencer 100A disposed below the waterline 180 of a marine vessel 110. A propulsion engine 115 is also shown in FIG. 1 disposed below waterline 180, as may be desirable or necessary in certain marine vessels. Engine 115 may, in other embodiments, need not be a propulsion engine but, rather, may be an electric generator or may be used for any other purpose. Moreover, engine 115 need not be disposed within a marine vessel. For example, engine 115 could be included in a drilling assembly and be used for providing electric power. Also, engine 115 may be a gasoline engine, a diesel engine, or an engine of some other conventional design or design to be developed in the future.

In the illustrated embodiment, a liquid coolant 130 flows through a coolant conduit 132 and is mixed with exhaust gas 140 as it exits engine 115 through an exhaust conduit 142. Typically, liquid coolant 130 is engine cooling water. However, liquid coolant 130 could, in some implementations, include or constitute coolant from other sources, such as water pumped directly from the outside of the vessel without being used to cool engine 115. The fluid mixture of exhaust gas 140 and liquid coolant 130, hereafter referred to as fluid mixture 150, flows through fluid-mixture conduit 152 into silencer 10A. In the illustrated embodiment, waterlift silencer 100A includes a fluid-mixture inlet pipe 105 that is fluidly connected to conduit 152 using any conventional coupling 154.

Waterlift silencer 100A also includes a first mixture-expelling conduit 101 and a second mixture-expelling conduit 102 through which fluid mixture 150 is expelled in accordance with the operations of the invention as described below. As shown in FIG. 1, conduits 101 and 102 may be conventionally coupled, as by couplers 162 and 164, to extension conduits, such as conduits 107 and 109, that carry fluid mixture 150 above waterline 180. In other implementations, couplers 162 and 164 need not be present. Rather, conduits 101 and 102 may themselves carry fluid mixture 150 above waterline 180. For convenience, the assembly of conduits 107 and 109, and couplers 162 and 164, are not hereafter referred to, but will be understood to be possible in some implementations. Thus, it is hereafter illustratively assumed that fluid mixture 150 may simply exit waterlift silencer 100A through mixture-expelling conduits 101 and 102 in accordance with the operation of the invention as described below. More specifically, as described below with respect to FIGS. 4 and 5, conduits 101 and 102 have bottom portions that are disposed within a holding chamber of waterlift silencers 100 and into which fluid mixture 150 may flow. Conduits 101 and 102 typically are referred to hereafter as having top portions (corresponding respectively to conduits 107 and 109 of the alternative implementation of FIG. 1) that are disposed outside of the holding chamber and through which fluid mixture 150 is carried above waterline 180.

In order to protect against fluid mixture 150, or water from the marine environment, flowing backward through waterlift silencer 100A and into engine 115, the top portions of conduits 101 and 102 (corresponding respectively to conduits 107 and 109 of the implementation of FIG. 1) typically extend higher than waterline 180. For example, they may extend to or above some height such as illustrative level 170 above waterline 180 as shown in FIG. 1. The top portions of mixture-expelling conduits 101 and 102 (or 107 and 109) then typically slope downwardly until they exit the hull of vessel 110 at a point above waterline 180, such as exit port 175. Fluid mixture 150 exits vessel 110 at exit port 175. Mixture-expelling conduits 101 and 102 (or 107 and 109) may, in some implementations, be joined for convenience of fabrication and/or installation in the downward-sloping portion, such as represented by joint downward-sloping conduit 173 of FIG. 1. As is evident, one of the factors determining the height of level 170 is the length and slope of conduit 173.

Figure 2:
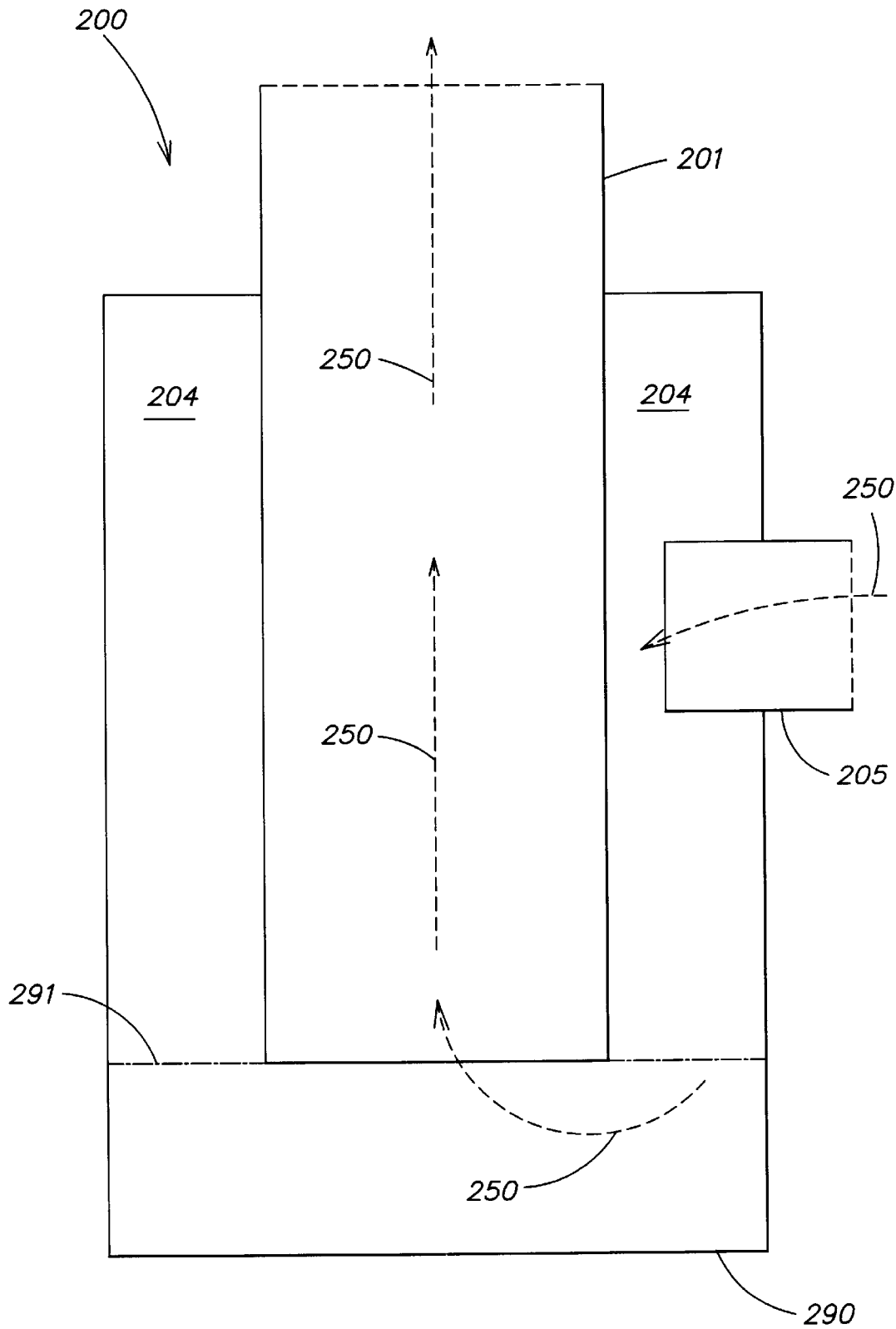
FIG. 2 is a cross-sectional side view of one type of conventional single-conduit waterlift silencer.

The advantages of waterlift silencers 100 may perhaps better be appreciated in comparison to the operation of a typical conventional waterlift silencer. FIG. 2 is a cross-sectional side view of a conventional single-tube waterlift silencer 200, such as is described in U.S. Pat. No. 3,296,997 to Hoiby, et al. A fluid mixture 250 of liquid coolant and exhaust gas enter a holding chamber 204 of conventional waterlift silencer 200 through a fluidmixture inlet pipe 205. As noted in the background section above, an exit tube 201 extends vertically through the top of chamber 204 and is spaced from the bottom 290 of the chamber. Under appropriate operating conditions, the gas and entrained liquid coolant, referred to for convenience as mixture 250, is expelled from chamber 204 through exit tube 201. Generally, these operating conditions occur when the static pressure in the chamber is such as to depress the free-surface level of mixture 250 to about the height of tube 201 above bottom 290, that is, to free-surface height 291 of FIG. 2, and the velocity of the exhaust gas is high enough to partially atomize the liquid coolant.

Figure 3:
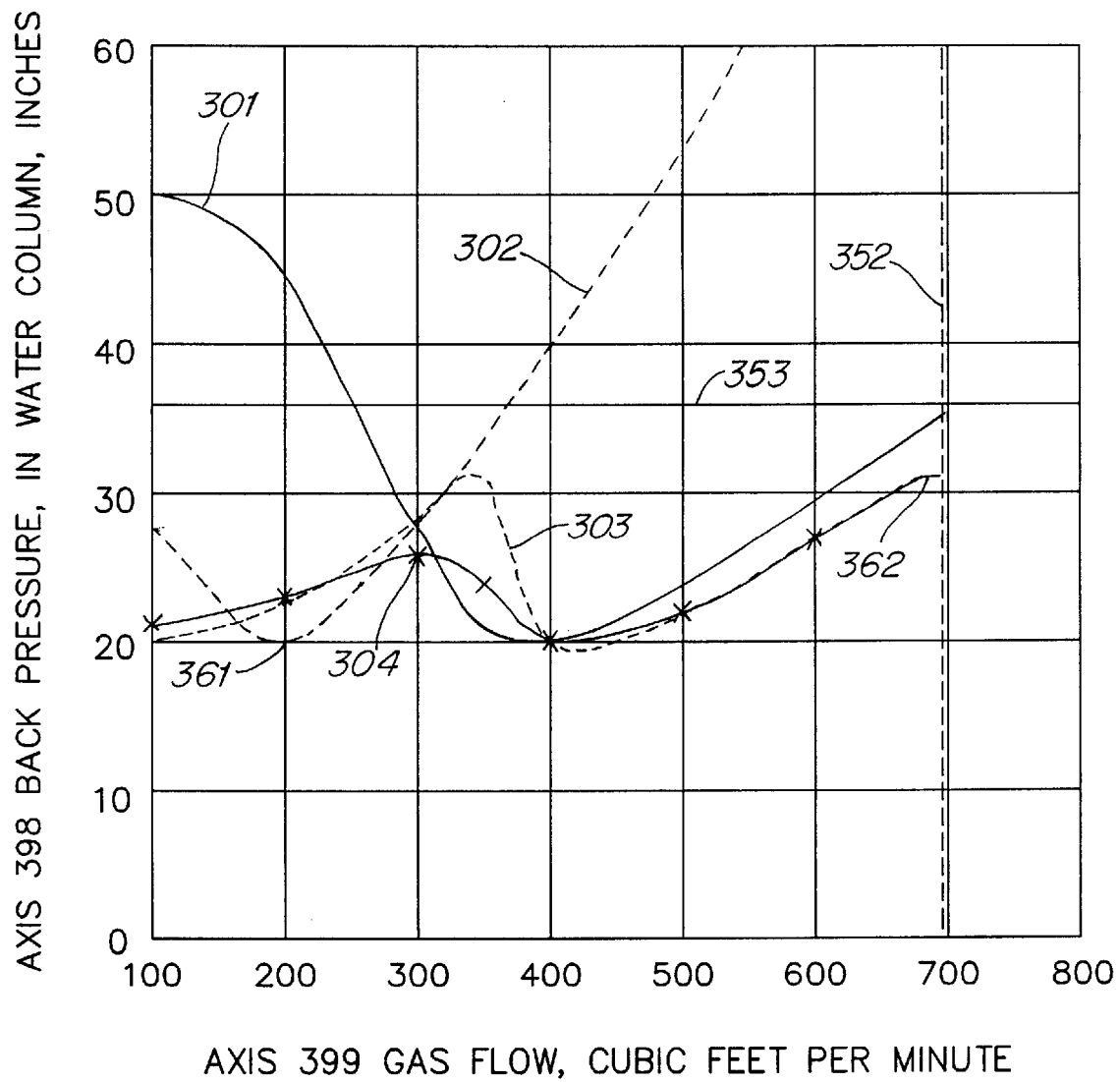
FIG. 3 is a graphical representation of exemplary plot lines of dynamic gas pressure plotted as a function of exhaust gas volume flow rate for a conventional waterlift silencer and for alternative embodiments of waterlift silencers of the present invention.

One disadvantage of this conventional arrangement is shown by reference to FIG. 3 that includes various exemplary graphical representations of back pressure plotted as a function of exhaust gas volume flow rate for alternative configurations of mixture-expelling conduits. The horizontal axis 399 represents values of the volume flow rate of the exhaust gas as it enters a silencer from the engine. For convenience, axis 399 is labeled with values in cubic feet per minute, although it will be understood that the plot lines are exemplary and approximate and that the specific values of exhaust gas volume flow rate indicated by reference to the values of axis 399 are illustrative only. The vertical axis 398 represents values of the static gas pressure head in the holding chamber, which is approximately equivalent to the back pressure generated by the silencer that is reflected back upon the engine. Also for convenience, axis 398 is labeled with values of pressure in water-column inches, although it will be understood that the plot lines are exemplary and approximate and that the specific values of back pressure indicated by reference to the values of axis 398 are illustrative only. More generally, the plot lines shown on FIG. 3 should be understood to be illustrative of general performance characteristics rather than specific, quantitative, performance.

FIG. 3 includes dashed vertical lines 352 that is provided for convenience of reference. Line 352 indicates those values of gas pressure for which the gas volume flow rate is 700 cubic feet per minute. It is assumed for illustrative purposes that the engine produces a gas volume flow rate of 700 cubic feet per minute when the engine is running at full power. Thus, line 352 hereafter is referred to as the "full-power line" and references to the "full-power rate" refer to 700 cubic feet per minute. At the lower extreme of axis 399, the gas volume flow rate is 100 cubic feet per minute, corresponding to an illustrative flow rate at the idling speed of an exemplary engine. Thus, references hereafter to the "idling rate" will be understood to refer to the value of 100 cubic feet per minute. It will be understood that these values of full-power rate and idling rate are illustrative only, and may vary substantially depending on the operating characteristics of the engine and other factors. A horizontal line 353 also is shown to represent an illustrative boundary above which the backpressure may be said to be "excessive." In this illustrative example, line 353 is drawn at a backpressure value of about 36 water-column inches, which corresponds to a typical value above which backpressure may be said to be excessive for some types of marine engines.

Plot line 301 of FIG. 3 is illustrative of the performance of a waterlift silencer that typically employs a single mixture-expelling conduit, such as the conventional device of FIG. 2 in which the mixture-expelling conduit is exit tube 201. As shown by plot line 301, large back pressures may be generated by conventional water silencer 200 at low gas volume flow rates. For example, the back pressure in this example is about 50 water-column inches at the idling rate, and this excessive back pressure condition persists for a range of values of gas volume flow rate up to about 250 cubic feet per minute. The back pressure drops to about 20 water-column inches for a range of flow rates midway between the idling rate and the full-power rate (line 352), and climbs again as the flow rate approaches the full-power rate.

As indicated by plot line 301, the back pressure exerted on the engine by the device of FIG. 2 typically is within normal ranges, i.e., is not excessive, for a range of gas volume flow rates corresponding to engine speeds above 250 cubic feet per minute and up to full power. Indeed, the diameter of exit tube 201, and other aspects of silencer 200, are determined in part to achieve these normal back pressures. However, as noted, the back pressures for gas volume flow rates corresponding to engine speeds near and somewhat above the idling rate may be excessive. It will be understood that the problem is substantially the same if two or more concurrently operative exit tubes (not shown) are used having a total cross-sectional area substantially equivalent to the cross-sectional area of exit tube 201. In that case, assuming that silencer 200 is arranged so that fluid-mixture 250 flows concurrently (as opposed to sequentially) through each of the tubes, the back pressure will vary as a function of gas volume flow rate substantially in the manner represented by plot line 301; e.g., the engine will be subjected to excessive back pressures at and near the idling rate. It will be understood that the use of the idling rate as a reference in this respect is illustrative only, and that the range of excessive back pressures may extend to gas volume flow rates that are lower or higher than the exemplary idling rate shown in FIG. 3.

The reason that this excessive back pressure develops is that, at lower gas-flow velocities, fluid mixture 250 may initially rise in exit tube 201 but not achieve the state of a partially atomized mixture flowing through tube 201. (Ideally, the gas-flow velocity is the gas volume flow rate divided by the cross-sectional area of exit tube 201.) That is, the system is unstable in the sense that water droplets are not entrained in a flow of a fluid mixture of exhaust gas and water coolant through exit tube 201. Rather, the liquid coolant blocks off the bottom of exit tube 201 and the static pressure in chamber 204 thus increases as exhaust gas 250 continues to flow into chamber 204 and must bubble through the standing water-column in exit tube 201.

As noted, the problem of excessive back pressure at lower engine speeds experienced by conventional silencer 200 can be addressed by decreasing the cross-sectional area of exit tube 201. However, as also noted, this solution creates the related problem of excessive back pressure at higher engine speeds. This trade-off situation is represented by plot line 302 of FIG. 3, which represents gas pressure as a function of gas volume flow rate for a single mixture-expelling conduit (not shown) that has a substantially smaller cross-sectional area than that of exit tube 201. For example, the cross-sectional area of exit tube 201 may illustratively be assumed to be approximately 40 square inches so as to result in plot line 301, whereas the smaller exit tube giving rise to plot line 302 is illustratively assumed to have a cross sectional area of approximately 20 square inches.

As shown by plot line 302, the smaller cross-sectional area of the exit tube results in an illustrative back pressure of about 28 water-column inches at the idling rate. Thus, the excessive back pressures experienced using the larger-diameter tube 201 of the conventional device of FIG. 2 are avoided. The reason is that the entraining of fluid droplets in a fluid mixture of liquid coolant and exhaust gas occurs at lower gas volume flow rates for the smaller conduit than is the case for the conduit having a larger cross-sectional area. Thus, the bottom of the smaller conduit is not blocked off at low gas flow velocities by liquid coolant, as occurs with respect to conventional designs having a conduit with a larger cross-sectional area, as noted above. Exhaust gas therefore flows through the holding chamber carrying with it entrained droplets of liquid coolant in a fluid mixture so that a buildup of dynamic pressure at low gas flow velocities is avoided. Thus, the back pressure at these lower velocities (or, equivalently, lower engine speeds) is less than it is for conduits having larger cross-sectional areas.

However, as indicated by plot line 302 of FIG. 3, the back pressure for a silencer using this exemplary single, smaller-diameter, mixture-expelling conduit climbs rapidly as the gas volume flow rate increases beyond a minimum back pressure point, which is located at point 361 in this example (at about 20 water-column inches on axis 398 and 200 cubic feet per minute on axis 399). That is, there characteristically is a minimum back pressure point that occurs at the lowest gas volume flow rate for which good partial atomization of the liquid coolant takes place. Moreover, in this typical example, this lowest gas volume flow rate (about 200 cubic feet per minute) corresponds to a relatively low engine speed. Thus, back pressure is generally high for a large portion of the operating range of the engine, and reaches excessive levels at an exemplary flow rate as low as about 375 cubic feet per minute. Eliminating low-speed excessive back pressure simply by decreasing the diameter of the mixture-expelling tube therefore typically generates unacceptable back pressures if the engine also is to be operated at higher speeds.

The problem of excessive back pressure at low engine speeds, and the trade-off problem of excessive back pressure at higher engine speeds, are addressed by various embodiments of the present invention. Some of these embodiments are now described with reference to FIGS. 4 through 11.

Figure 4:
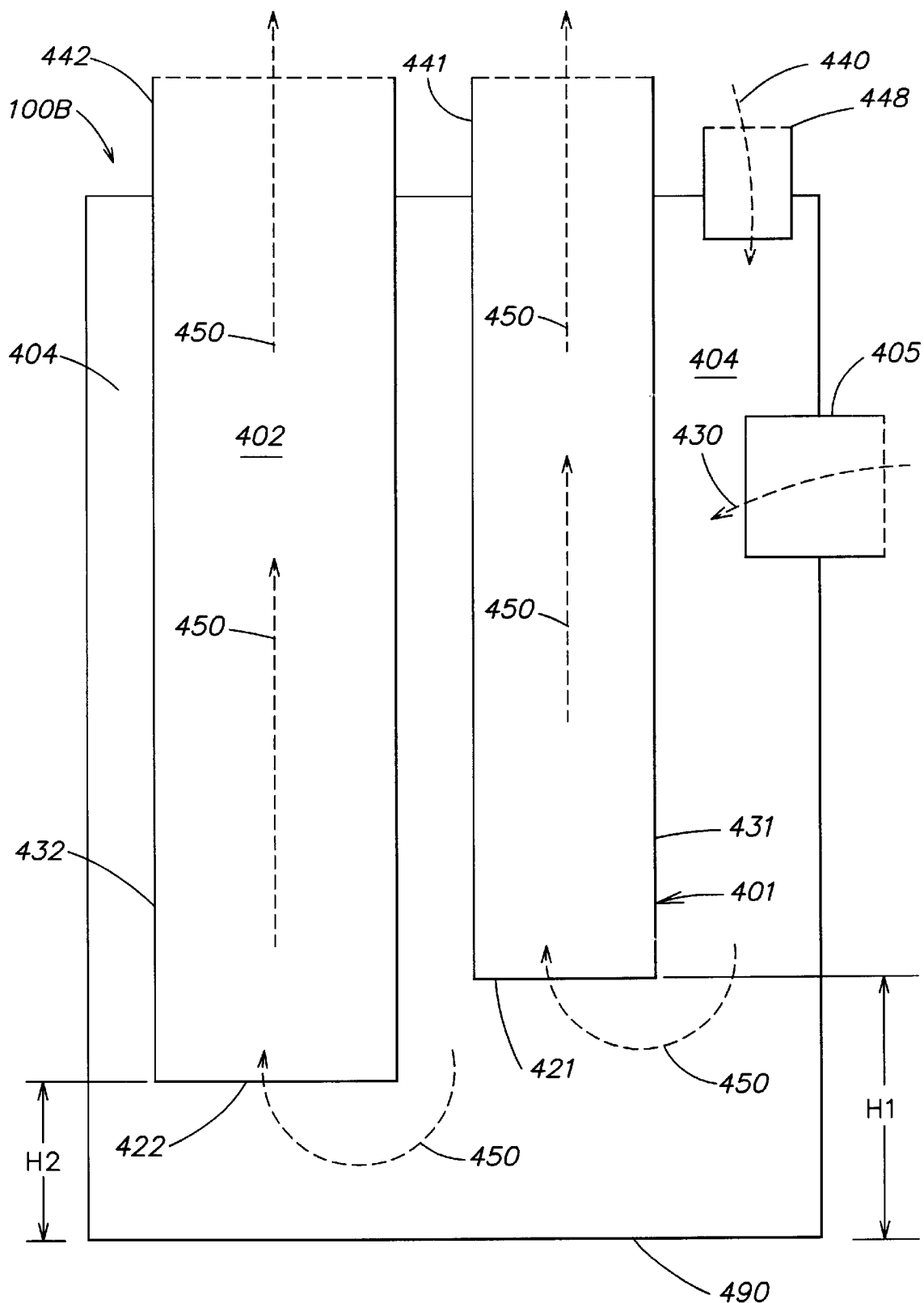
FIG. 4 is a cross-sectional side view of one embodiment of a waterlift silencer in accordance with the invention having separate inflow ports for exhaust gas and liquid coolant.

FIG. 4 is a cross-sectional side view of one implementation of waterlift silencers 100 of the present invention, referred to as waterlift silencer 100B. Waterlift silencer 100B includes two mixture-expelling conduits, 401 and 402 having bottom portions 431 and 432, respectively, disposed within a holding chamber 404, and top portions 441 and 442, respectively, disposed outside of holding chamber 404. Holding chamber 404 may be cylindrical, cubic, or any of numerous shapes and configurations suitable for enabling the flow of fluid mixture 450 into conduits 401 and 402 in accordance with the operation of the present invention. The shape of holding chamber 404 may be determined in some implementations in accordance with considerations not material to the present invention, such as a desire to fit silencer 100B in a particular space within a marine vessel, or to adapt silencer 100B to positioning with respect to the marine engine it is silencing. In FIG. 4, conduits 401 and 402 are shown as exiting from the top of holding chamber 404. However, it need not be so. For example, in alternative embodiments, one or both of conduits 401 and 402 may exit from any side wall of holding chamber 404.

In the illustrated embodiment, conduit 401 has a smaller cross-sectional area (i.e., in this implementation is a tube having a smaller diameter) than conduit 402. In alternative implementations, however, the cross-sectional areas of the two conduits could be approximately the same, or the cross-sectional area of conduit 401 could be greater than that of conduit 402. Returning to the illustrated embodiment, the bottoms 421 and 422 of conduits 401 and 402, respectively, are open. The height HI of the opening in bottom 421 above bottom surface 490 is greater than the height H2 of the opening in bottom 422. In the embodiment of FIG. 4, exhaust gas 440 enters holding chamber 404 through a gas inlet pipe 448. Although pipe 448 is disposed at the top of holding chamber 404 in FIG. 4, it need not be so. Pipe 448 may be located, for example, on any side wall of holding chamber 404 in alternative embodiments, or may enter through bottom surface 490 of holding chamber 404. Liquid coolant 430 enters holding chamber 404 through coolant inlet pipe 405, the disposition of which similarly is not limited to the side-wall entrance shown in FIG. 4. Exhaust gas 440 and liquid coolant 430 mix in the bottom portion of holding chamber 404 to produce fluid mixture 450. In accordance with the operation of the invention, as described below in relation to FIG. 5, fluid mixture 450 is expelled through mixture-expelling conduits 401 and 402. In alternative implementations, an inlet pipe, such as inlet pipe 405, may be disposed to introduce fluid mixture 450 into holding chamber 404. That is, liquid coolant 430 and exhaust gas 440 may be mixed externally to silencer 100B and introduced in a mixed state through an inlet pipe disposed such as inlet pipe 405. This alternative configuration is described below with respect to FIG. 5. Also, in those alternative configurations, supplemental liquid, which may be liquid coolant or may be water or other fluid that is not used to cool the engine, may be added to holding chamber 404 through an inlet pipe disposed such as inlet pipe 448.

Figure 5:
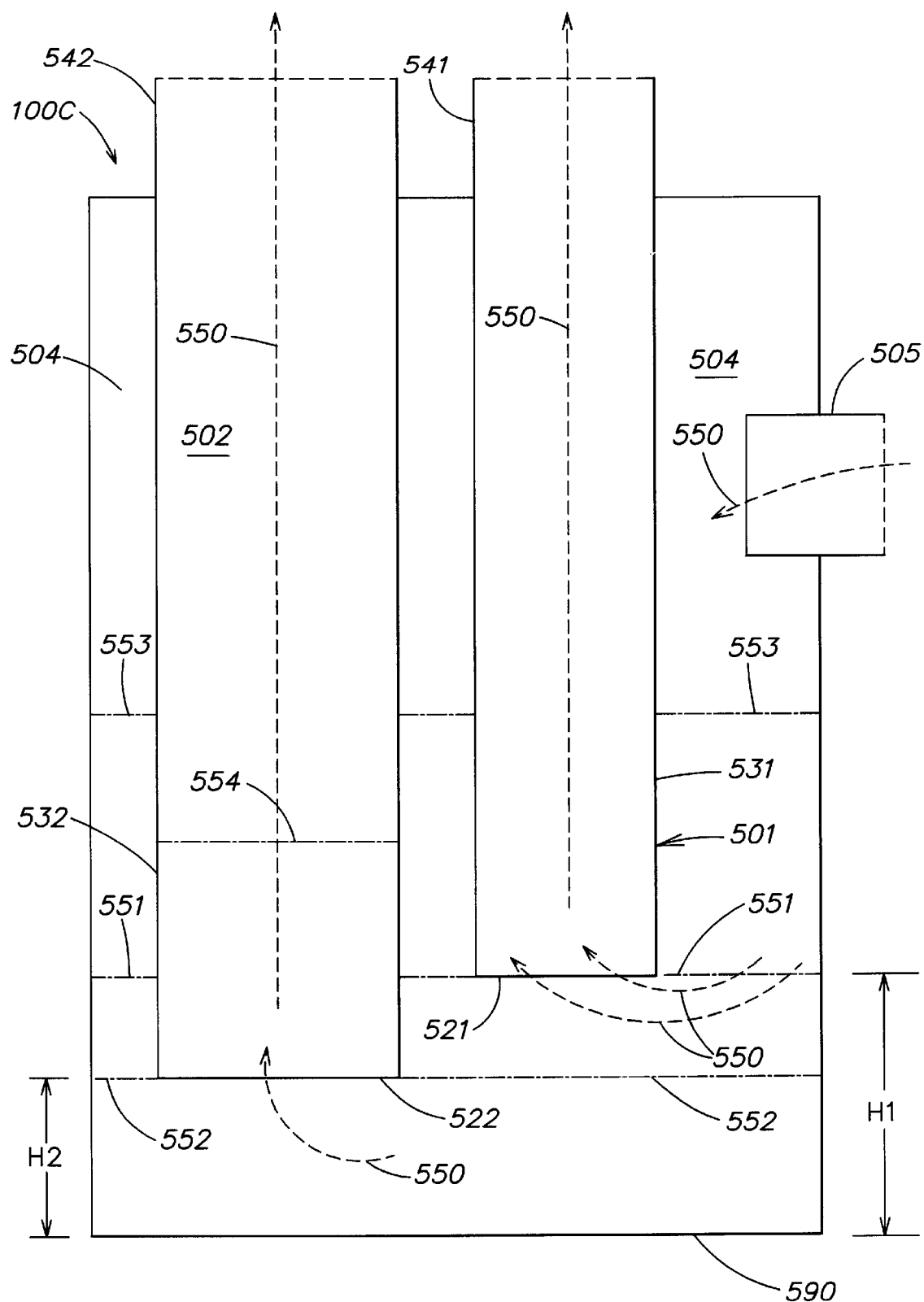
FIG. 5 is a cross-sectional side view of one implementation of the waterlift silencer of FIG. 1 in which two mixture-expelling conduits having open bottom ends are included.

FIG. 5 is a cross-sectional side view of another implementation of waterlift silencers 100 of the present invention, referred to as waterlift silencer 100C. Silencer 100C is similar to silencer 100B of FIG. 4 except that, in silencer 100C, the exhaust gas and liquid coolant are mixed prior to entering, as in waterlift silencer 100A of FIG. 1. The resulting fluid mixture 550 enters the holding chamber 504 of silencer 100C through a fluid-mixture inlet pipe 505.

Inlet pipe 505 is shown in FIG. 5 as entering through a side wall of holding chamber 504 near the top of the chamber, but it need not be so. In alternative aspects of this implementation, for example, inlet pipe 505 could enter through the top or bottom of holding chamber 504, or trough a portion of a side wall nearer to bottom surface 590.

Conduits 501 and 502 have respective bottom portions 531 and 532 disposed within holding chamber 504, and respective top portions 541 and 542 disposed outside of holding chamber 404. In FIG. 5, conduits 501 and 502 are shown as exiting from the top of holding chamber 504 but, as noted with respect to conduits 401 and 402, it need not be so in alternative implementations. The bottoms 521 and 522 of conduits 501 and 502, respectively, are open. It will be understood that, in alternative implementations, the bottoms of conduits 501 and 502 may be partially open, e.g., they may be capped with a cap having an opening in it. Also, they may be closed, but have one or more openings in a side wall. Hereafter, references will be made simply to "open bottom" conduits, although it will be understood that many variations are possible that provide an opening for a fluid mixture to enter a conduit. As with respect to the similar configuration of pipes 401 and 402 of FIG. 4, the height H1 of the opening in bottom 521 of conduit 501 above bottom surface 590 is greater than the height H2 of the opening in bottom 522 of conduit 502.

Conduit 501 has a cross-sectional area that typically is substantially smaller than the cross-sectional area of a single mixture-expelling conduit, such as conduit 201, that may be used in a conventional waterlift silencer. For example, conduit 501 may be a tube having a diameter of approximately 3.5 inches, or a cross-sectional area of approximately ten square inches. In this example, it is illustratively assumed that conduit 502 has a diameter of approximately 7 inches, or a cross-sectional area of approximately 40 square inches. It should be understood that, in alternative implementations, conduit 501 and/or conduit 502 need not be cylindrical, and need not have a uniform cross-sectional area either within holding chamber 504 or outside of the chamber.

Because of its smaller cross-sectional area, conduit 501 would not typically be employed as a single mixture-expelling conduit, as was demonstrated with respect to plot line 302 that assumed a single exit-tube that had a cross-sectional area of approximately 20 square inches. Thus, if used alone, conduit 501 would generally result in even higher back pressures at higher engine speeds than those shown with respect to plot line 302. The reason, as noted, is that the smaller size of the conduit, used alone, tends to result in excessive back pressures at higher engine speeds. However, as also noted, the smaller cross-sectional area of conduit 501 means that the entraining of fluid droplets in a fluid mixture occurs at lower gas volume flow rates so that the bottom of the smaller conduit is not blocked off at low gas flow velocities by liquid coolant, as occurs with respect to the larger single conduit. Thus, exhaust gas flows through chamber 504, and a buildup of dynamic pressure at low gas flow velocities thereby is avoided.

The operation of waterlift silencer 100C at lower engine speeds is now more specifically described. When the engine is started, fluid mixture 550 flows through inlet pipe 505 into holding chamber 504 and rises so that the free surface of the mixture attains an initial level illustratively represented in FIG. 5 by free-surface level 553. (Fluid mixture 550, and/or water due to condensation or other causes, may also be present in the bottom of holding chamber 504 prior to the start of the engine.) Although not shown in order to preserve the clarity of FIG. 5, fluid mixture 550 has an initial free-surface level inside of conduits 501 and 502 that is essentially the same as that outside the conduits because the bottoms 521 and 522 of the conduits are open. As fluid mixture 550 continues to be pushed into holding chamber 504 by the engine, some exhaust gas separates from fluid mixture 550 and occupies the upper portions of chamber 504, i.e., above initial free-surface level 553. This exhaust gas produces a static pressure in chamber 504 that pushes downward the free-surface level of fluid mixture 550 outside of conduits 501 and 502. This static pressure increases due to the continuing addition of fluid mixture 550 into holding chamber 504. At a particular value of static pressure in the top portions of holding chamber 504, the free surface of fluid mixture 550 is pushed downward to a free-surface level 551 that is approximately the same as the height H1 of open bottom 521 of conduit 501. At this static pressure, fluid mixture 550 has a free surface level inside of conduit 502 that is above its open bottom 522 so that the bottom of conduit 502 is substantially sealed with respect to the exhaust gas in the upper portions of chamber 504. However, as the free surface of fluid mixture 550 is pushed just below level 551, a similar seal of the open bottom 521 of conduit 501 is broken and exhaust gas from the upper portions of chamber 504 (i.e., above free surface level 551) rushes through open bottom 521 and rises in conduit 501 due to buoyancy effects and static pressure. The cross-sectional area of conduit 501 is such that the gas velocity is great enough to partially atomize, and entrain in the gas flow, droplets of fluid mixture 550. Thus, fluid mixture 550 is carried upward through conduit 501. Once partially atomized flow starts, the free surface is pushed further below level 551 due to dynamic flow effects at open bottom 521.

In a similar manner, the seal of bottom 522 of conduit 502 is not broken until the free surface level of fluid mixture 550 drops just below a free-surface level 552 that is approximately the same as the height H2 of open bottom 522 above bottom surface 590. As noted, bottom 522 of conduit 702 is disposed in relation to bottom 521 of conduit 501 so that H2 is smaller than H1. Thus, a greater gas volume flow rate (i.e., higher engine speed) typically is required to generate a dynamic effect sufficient to push the free surface level of fluid mixture 550 to height H2 than to height H1. When the free surface is forced to H2 or lower, however, the total cross-sectional area operative for carrying fluid mixture 550 out of holding chamber 504 is increased from the cross-sectional area of conduit 501 alone to the cross-sectional area of conduits 501 and 502 together. Thus, in this example in which conduit 502 is a tube having a cross-sectional area of approximately 40 square inches, the total cross-sectional area changes from about ten square inches to about 50 square inches. Therefore, the dynamic pressure does not continue to rise even while the gas volume flow rate continues to increase.

Advantageously, heights Hi and H2 may be determined so that the additional cross-sectional area of conduit 502 is operative (i.e., with respect to the illustrated implementation of FIG. 5, the fluid seal is broken in the illustrated implementation) at or near a point where the gas volume flow rate becomes great enough so that, if only conduit 501 were operative, the static gas pressure would begin to rise toward undesirable levels of back pressure. The particular values of H1 and H2 appropriate to achieve this relationship depend, as may now be appreciated by those skilled in the relevant art, on various factors such as the dimensions of conduits 501 and 502 and holding chamber 504, the proportion of exhaust gas to liquid coolant (and or supplemental liquid) in fluid mixture 550, and other factors.

This selective placement of open bottoms 521 and 522 of conduits 501 and 502, both with respect to each other and with respect to bottom surface 590, thus provides automatic sequential operation of conduits 501 and 502. This sequential operation may be viewed as being alternatively a function of static pressure, dynamic pressure, gas volume flow rate, liquid coolant flow rate, exhaust gas flow velocity, engine speed, the free surface level of fluid mixture 550, or various combinations thereof, because these variables are related to each other in ways that will now readily be appreciated by those skilled in the relevant art.

For example, at a lower range of exhaust gas flow velocities, as measured at the opening in bottom 521 of conduit 501, it may be illustratively assumed that the water seal at that opening has been broken, as explained above, and that conduit 501 therefore has become dynamically operative. However, it may be assumed that this range of velocities is not sufficient to have resulted in sufficient dynamic flow effects to push the free surface below open bottom 522 of conduit 502. Thus, as noted above, the water seal at bottom 522 of conduit 502 has not been broken. Thus, conduit 502 is not dynamically operative over this lower range of exhaust gas flow velocities, as measured at the opening in bottom 521 of conduit 501. Over a higher range of exhaust gas flow velocities at the opening in bottom 521, the dynamic flow effects may be assumed to be sufficiently large to push the free surface below open bottom 522. Thus, as also noted above, conduit 502 becomes dynamically operative over this higher range. Therefore, one of a number of ways of describing the sequential operation of conduits 501 and 502 is with reference to the exhaust gas flow velocity at the opening in the bottom of conduit 501.

Another illustrative description of sequential operation may be stated in terms of liquid coolant volume flow rate and exhaust gas volume flow rate. Particularly combinations of these two flow rates may have the combined effect of changing free-surface level 553, so that the water seals blocking conduit 501 or conduit 502 may be broken, as described above. The two flow rates may also have the combined effect of changing the conditions at which dynamic operation of conduits 501 or 502 may occur; e.g., when the exhaust gas volume flow rate is high enough to create dynamic effects at the inlet of a conduit.

Irrespective of the way it is described, the technique for sequential operation that is illustratively represented in FIG. 5 is self-compensating. Self-compensation occurs because the total cross-sectional area operative for carrying the fluid mixture (having partially atomized liquid drops entrained in the gas flow) automatically experiences a step-like increase if the gas volume flow rate increases beyond a pre-determinable value, and automatically experiences the reverse step-like decrease if the gas volume flow rate decreases below that pre-determinable value. Thus, the total operative cross-sectional area is suitable for limiting back pressure as a function of the operating speed of the engine: i.e., the area is smaller at lower operating speeds and greater at higher operating speeds.

The impact of this automatic, self-compensating, sequential operation with respect to the relationship between gas volume flow rate and dynamic pressure (or back pressure) is graphically represented by plot line 303 of FIG. 3. At low engine operating speeds, the back pressure is relatively low, e.g., about 20 water-column inches at idling speed, due to the low cross-sectional area consisting only of the cross-sectional area of conduit 501. Moreover, the back pressure remains below the excessive backpressure line 353 (36 water-column inches) for for the entire range of engine operating speeds. This advantageous operating characteristic is achieved, as noted, because of the sequential operation of conduit 502 so that the effective cross-sectional area for lifting fluid mixture 550 is the combined areas of conduits 501 and 502. The value of these combined areas is determined so that, even at the full-power operating speed, the back pressure remains at an acceptable value of about 32 water-column inches, as indicated by point 362.

As noted, it generally is possible to predetermine values of H1 and H2 so that sequential operation of conduits 501 and 502 eliminates excessive back pressure from being exerted on the engine. However, some factors, typically transient in nature, may alter the value of dynamic gas pressure at which sequential operation occurs with respect to the implementation of FIG. 5. For example, movement of the marine vessel may cause fluid mixture 550 to slosh about in holding chamber 504 so that the fluid seal at bottom 522 of conduit 502 is prematurely broken. That is, although the gas flow may be less than the value normally required to push the free surface level of fluid mixture 550 below height H2, sloshing could nonetheless break the seal. In that case, the sudden increase in total cross-sectional area could reduce the exhaust gas flow velocity below a speed required to partially atomize the liquid coolant and entrain it in a gas flow. The pressure in holding chamber 504 thus may become unstable as the flow collapses in one or both conduits and the gas must bubble through the resulting standing column(s) of water.

Figure 6:
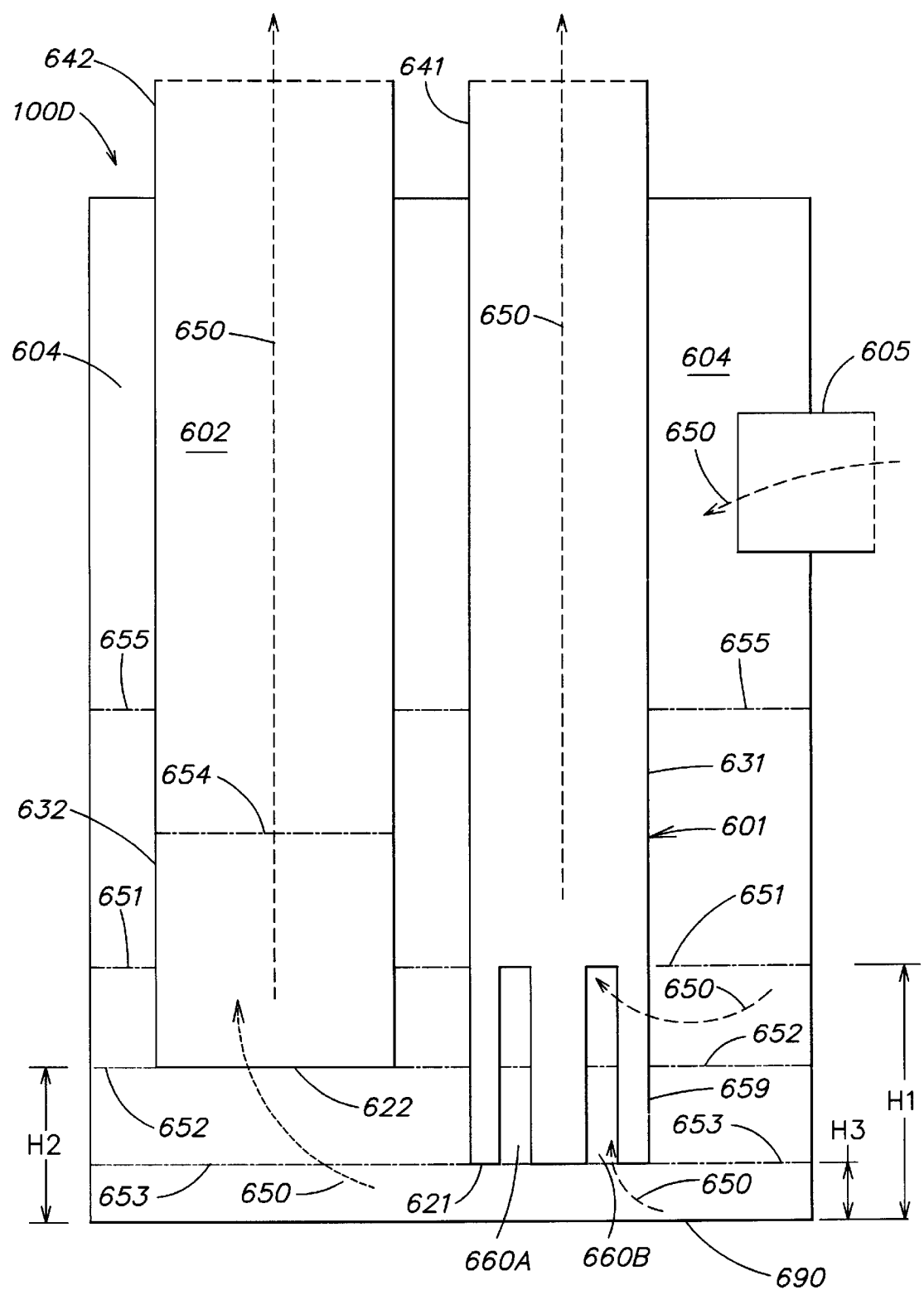
FIG. 6 is a cross-sectional side view of another implementation of the waterlift silencer of FIG. 1 in which two mixture-expelling conduits having open bottom ends, and one also having slots in its bottom portion, are included.
Figure 7:
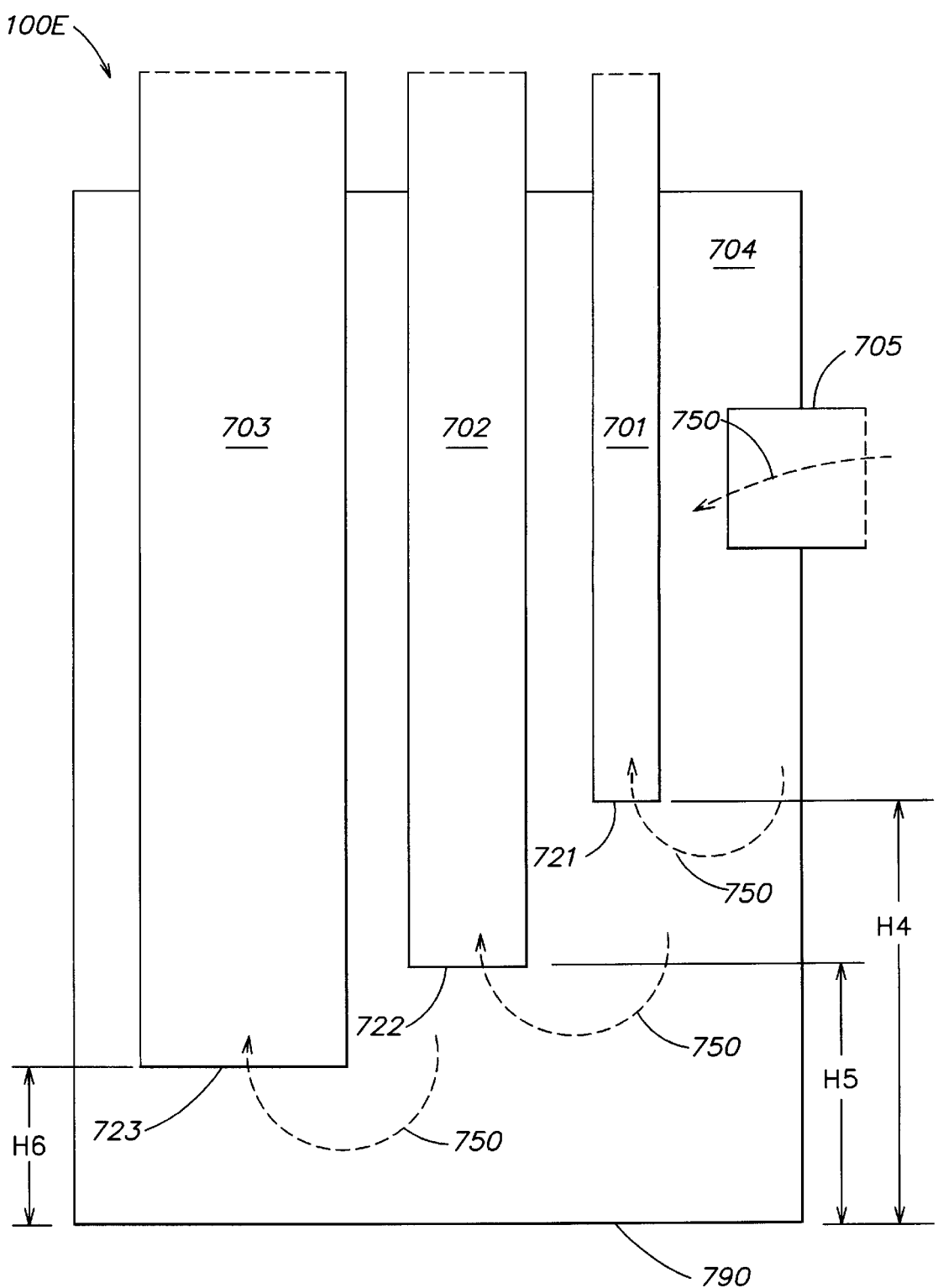
FIG. 7 is a cross-sectional side view of one embodiment of a waterlift silencer in accordance with the present invention having more than two mixture-expelling conduits.

In order to mitigate against these transient influences, alternative embodiments of waterlift silencers 100 include slots in the smaller conduit. One implementation of this approach is shown in FIG. 6, which is a cross-sectional side view of waterlift silencer 100D that is similar to silencer 100C of FIG. 5 except that the smaller-diameter conduit includes a slotted extension portion at its bottom. Specifically, waterlift silencer 100D includes mixture-expelling conduits 601 and 602. For convenience of comparison with the operations of silencer 100C described above, it is illustratively assumed that conduits 601 and 602 have cross-sectional areas of approximately ten square inches and 40 square inches, respectively. Conduits 601 and 602 have respective bottom portions 631 and 632 disposed within holding chamber 604, and respective top portions 641 and 642 disposed outside of holding chamber 604. The bottoms 621 and 622 of conduits 601 and 602, respectively, are open. Waterlift silencer 100D also includes a fluid-mixture inlet pipe 605 through which a fluid mixture 650 of exhaust gas and liquid coolant enters chamber 604.

Unlike conduit 501 of silencer 100C, conduit 601 has a slotted extension portion 659 in which one or more slots, such as illustrative slots 660A and 660B (generally and collectively referred to as slots 660), are cut. For ease of comparison, bottom 622 of conduit 602 is assumed to be disposed at the same height, H2, as is bottom 522 of conduit 502 of silencer 100C. However, whereas H1 is the height of bottom 521 of conduit 501, the same height H1 in FIG. 6 is assumed for the sake of comparison to be the height of the top of slots 660 above bottom surface 690. In the illustrated implementation, slots 660 extend downwardly to a height H3 above bottom surface 690 of chamber 604. Although the tops of slots 660A and 660B are at the same height H1 in the illustrated implementation, and both extend to height H3 at their bottoms, it need not be so in alternative implementations. Rather, the tops of slots 660 may be at various heights, and neither the lengths, widths, nor shapes of the slots need be uniform.

When the engine is started, fluid mixture 650 flows through inlet pipe 605 into holding chamber 604 and rises so that the free surface of the mixture attains an initial level represented in FIG. 6 by free-surface level 655, which is illustratively shown to be greater than H1. The static pressure of exhaust gas in the upper portion of chamber 604 pushes downward the free-surface level of fluid mixture 650 outside of conduits 601 and 602. This pressure increases as the gas volume flow rate into holding chamber 604 continues to increase as the engine speed increases. At a particular value of pressure in the top portions of holding chamber 604, the free surface of fluid mixture 650 is pushed downward to a free-surface level 651 that is approximately the same as the height H1 of the top of slots 660. At this pressure, fluid mixture 650 has a free surface level, such as illustrative level 654, inside of conduit 602 that is above its bottom opening 622 so that the bottom of conduit 602 is substantially sealed with respect to the exhaust gas in the upper portions of chamber 604. However, as the free surface of fluid mixture 650 is pushed just below level 651, a similar seal at the top of slots 660 is broken and exhaust gas from the upper portions of chamber 604 (i.e., above free surface level 651) rushes through the tops of slots 660 and into conduit 601. This high-velocity flow of exhaust gas partially atomizes, and entrains in the gas flow, droplets of fluid mixture 650. Thus, fluid mixture 650 is carried upward through conduit 601.

Just below level 651, the effective cross-sectional area of conduit 601, through which the atomized droplets and gas flow, is restricted due to the walls of extension portion 659. The effective cross-sectional area is determined by the combined areas of slots 660 between height H1 and the height of the free surface level of mixture 650. As the pressure in the top portions of chamber 604 further increases with increased gas flow, the free surface of mixture 650 is pushed further below level 651 by resulting dynamic effects at slots 660 so that the effective cross-sectional area of the opening to conduit 601 is increased. In the illustrated implementation, this gradual increase in the effective cross-sectional area of the opening to conduit 601 overlaps the sequential operation of conduit 602 (but it need not be so in alternative implementations). That is, the gradual increase in the effective cross-sectional area of the opening to conduit 601 continues for a range of holding-chamber pressures that correspond to a pressure at which the free surface level is just below the top of slots 660 (i.e., free surface level 651 at height H1) to a pressure at which the free surface level reaches open bottom 621 of conduit 601 (i e., free surface level 653 at height H3). At a pressure intermediate of these two pressures, the free surface level reaches height H2. Just below this level, i.e., just below level 652, the fluid seal over bottom 622 of conduit 602 is broken and the cross-sectional area of conduit 602 is added to the effective cross-sectional area of conduit 601 at this level. Thus, a more gradual increase is achieved in the combined cross sectional areas of openings to conduits 601 and 602 through which partially atomized droplets entrained in exhaust gas may flow. The value of the combined cross sectional areas varies between a very small area as the free surface level drops just below level 651 to the combined total cross-sectional areas of conduits 601 and 602 (i.e., 50 square inches in this exemplary implementation) at a free surface level just below level 653.

The dimensions of slots 660, including the height above bottom surface 690 at which they start, may be adjusted to generate a wide variety of relationships between the height of the free surface of mixture 650 and the total, effective, cross-sectional areas of conduits 601 and 602. Moreover, as described below with respect to FIG. 7, additional conduits may be provided, and any one or more of them may also have slots. Thus, rather than the step-like transition of cross-sectional areas described with respect to silencer 100C of FIG. 4, a variety of transitions may be operative over a wide range of pressures or, alternatively stated, of engine speeds.

Plot line 304 of FIG. 3 is illustrative of the relationship between gas volume flow rate and dynamic gas pressure that is achieved by the exemplary configuration of conduits 601 and 602 of FIG. 6. Because of the gradual increase in the effective cross-sectional areas of openings to conduits 601 and 602, the buildup of pressure with increase in gas volume flow rate is more gradual in the middle range of gas volume flow rates (e.g., between 200 and 350 cubic feet per minute) than it is in the non-slotted configuration of FIG. 5, as may be seen by comparing plot line 304 (about 23 water-column inches at 350 cubic feet per minute) with plot line 303 (about 32 water-column inches at 350 cubic feet per minute). Another advantage of the slotted implementation of FIG. 6 is reduction of possible fluctuations in back pressure, described above with respect to the non-slotted implementation of FIG. 5, due to transient and other factors. These instabilities are reduced because the changes in effective cross-sectional areas are gradual in the implementation of FIG. 6, rather than step-like as in the implementation of FIG. 5.

Many variations are possible in accordance with the present invention with respect to the number and arrangement of mixture-expelling conduits. As shown in cross-sectional side view in FIG. 7, the number of conduits need not be limited to two, but may be three (as in FIG. 7), or more. Silencer 100E of FIG. 7 includes mixture-expelling conduits 701, 702, and 703, having respective open bottoms 721, 722, and 723, disposed at heights H4, H5, and H6, respectively, above bottom surface 790 of holding chamber 704. In the illustrated implementation, the cross-sectional area of conduit 703 is greater than that of conduit 702, which is greater than that of conduit 701. Also, H4 is greater than H5, which is greater than H6. Thus, in the illustrated embodiment, the smaller conduits are made sequentially operative prior to making the larger conduits operative. However, in alternative embodiments, it need not be so. For example, conduit 702, having a cross-sectional area greater than that of conduit 701 and less than that of conduit 703, may be operative after conduit 703 is operative by providing that open bottom 722 be disposed at a height above bottom surface 790 that is less than height H6 of conduit 703. That is, many variations are possible in the disposition in holding chamber 704 of the openings in mixture-expelling conduits of various cross-sectional areas. Moreover, as noted, any one or more of conduits 701, 702, or 703 may have a slotted extension as described above with respect to conduit 601. The many variations thus possible enable fine-tuning of the relationship between gas volume flow rate and back pressure to accommodate various operating characteristics of a variety of engines, anticipated variations in operating conditions, and other factors.

Figure 8A:
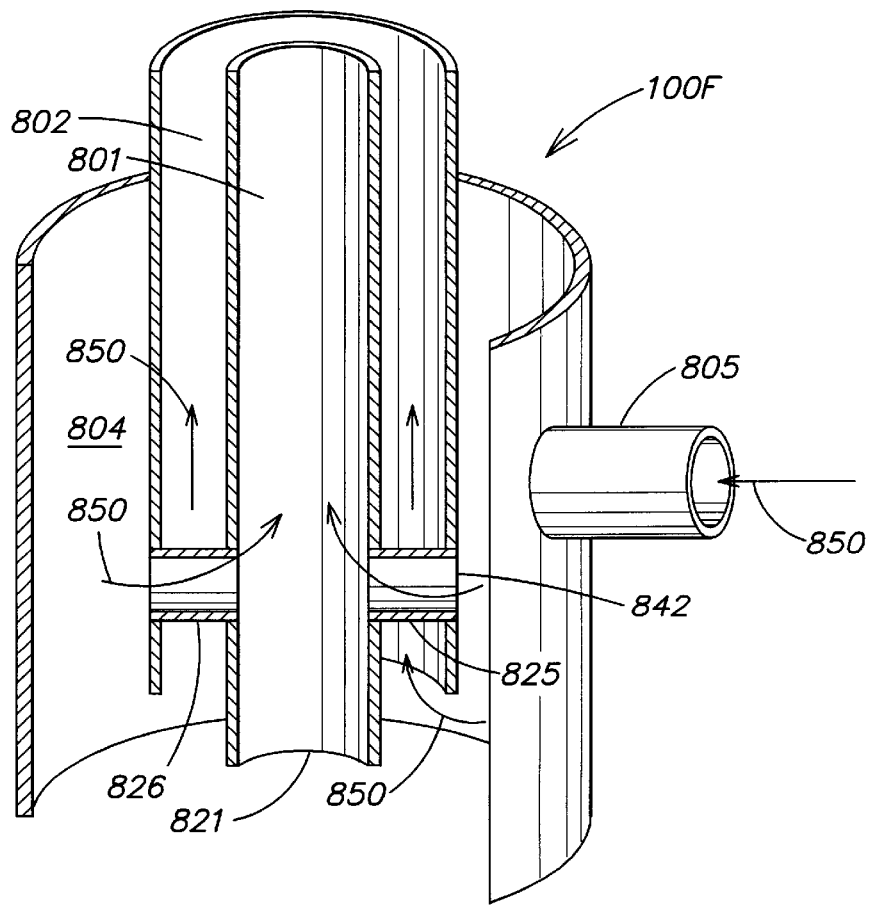
FIG. 8A is a cross-sectional side view of one embodiment of a waterlift silencer in accordance with the present invention having a smaller-diameter mixture-expelling conduit disposed concentrically within a larger-diameter mixture-expelling conduit within a holding chamber.
Figure 8B:
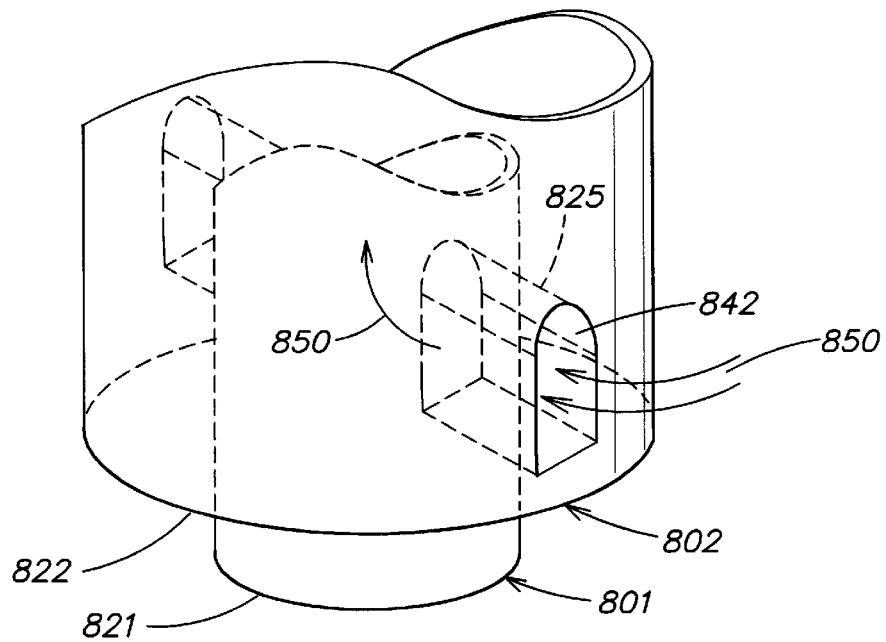
FIG. 8B is a perspective view of the mixture-expelling conduits of the waterlift silencer of FIG. 8A showing in shadow an interior-connecting conduit fluidly connecting the inner mixture-expelling conduit with the holding chamber.

In addition, many configurations are possible with respect to the disposition of mixture-expelling conduits with resect to each other, and with respect to the nature and placement of openings in them. One non-limiting example is shown in FIGS. 8A and 8B. FIG. 8A is a cross-sectional side view of waterlift silencer 100F that includes fluid-mixture inlet pipe 805, holding chamber 804, and mixture-expelling conduits 801 and 802. In this implementation, smaller-diameter conduit 801 is disposed concentrically within larger-diameter conduit 802. Fluid mixture 850 may enter conduit 801 through an open bottom 821 or through interior-connecting conduits 825 and 826. Interior-connecting conduits 825 and 826 each have an open end formed on (or, in other implementations, protruding from) the exterior surface of conduit 802. The other ends of conduits 825 and 826 also are open and are formed on (or, in other implementations, extend through) the interior surface of conduit 801. Thus, conduits 825 and 826 provide a fluid connection between holding chamber 804 and the interior of mixture-expelling conduit 801. Typically, interior-connecting conduits 825 and 826 are sealed at their connections with the outer surface of conduit 801 so that fluid mixture 850 may flow from holding chamber 804 into conduit 801 without entering conduit 802.

FIG. 8B is a perspective view showing interior-connecting conduit 825 in greater detail, in shadow, between conduits 801 and 802. Conduit 801 is shown largely in shadow (except for the portion near bottom 821 where it extends beneath open bottom 822 of conduit 802) within conduit 802. Opening 842 of interior-connecting conduit 825, disposed on the exterior surface of conduit 802, is streamlined so that its top portion is narrower than, and tapers down toward, a broader bottom portion. This streamlining is advantageous in some implementations to reduce turbulence in the flow of fluid mixture 850 in conduit 802 as it passes over the interior-connecting conduit 825.

It will be understood that, in alternative implementations, conduit 801 could have different numbers and/or placements of openings through interior-connecting conduits to holding chamber 804 than are shown in the illustrated implementation of FIGS. 8A and 8B. Conduit 801 need not have an open bottom in some implementations. The shape of interconnecting conduits need not be the streamlined shape of conduit 825. Mixture-expelling conduits may be nested in various arrangements: two smaller conduits near or adjacent to each other and both disposed inside a larger conduit, a smallest one inside a smaller one inside a larger one, and so on. Moreover, smaller conduit or conduits need not be aligned concentrically with respect to larger conduits.

Figure 9A:
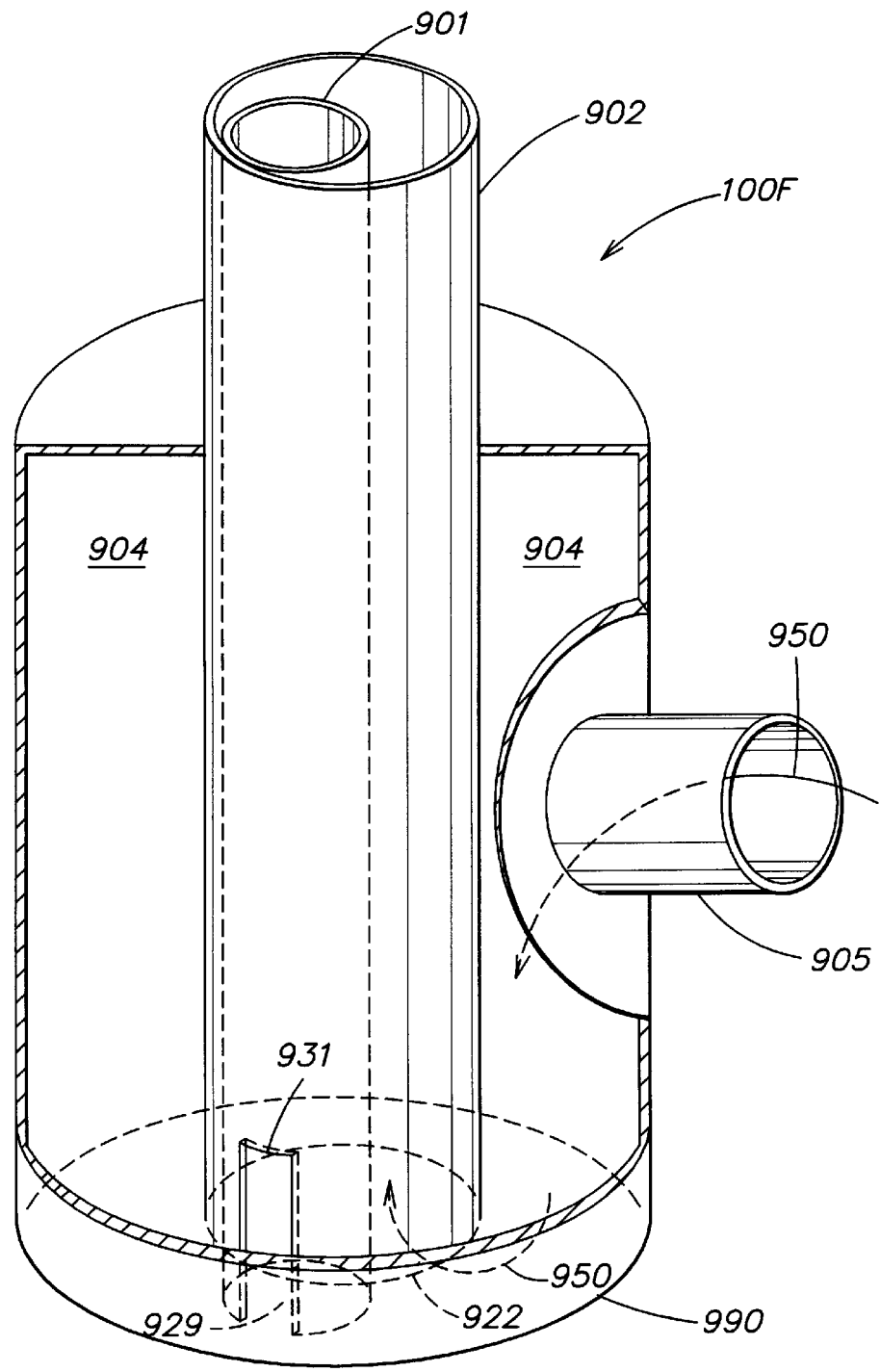
FIG. 9A is a cross-sectional side view of one embodiment of a waterlift silencer in accordance with the present invention having a smaller-diameter conduit disposed non-concentrically within a larger-diameter conduit within a holding chamber.
Figure 9B:
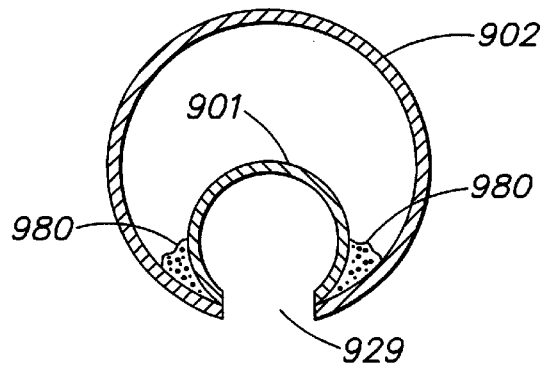
FIG. 9B is a cross-sectional top view of the mixture-expelling conduits of the waterlift silencer of FIG. 9A.
Figure 9C:
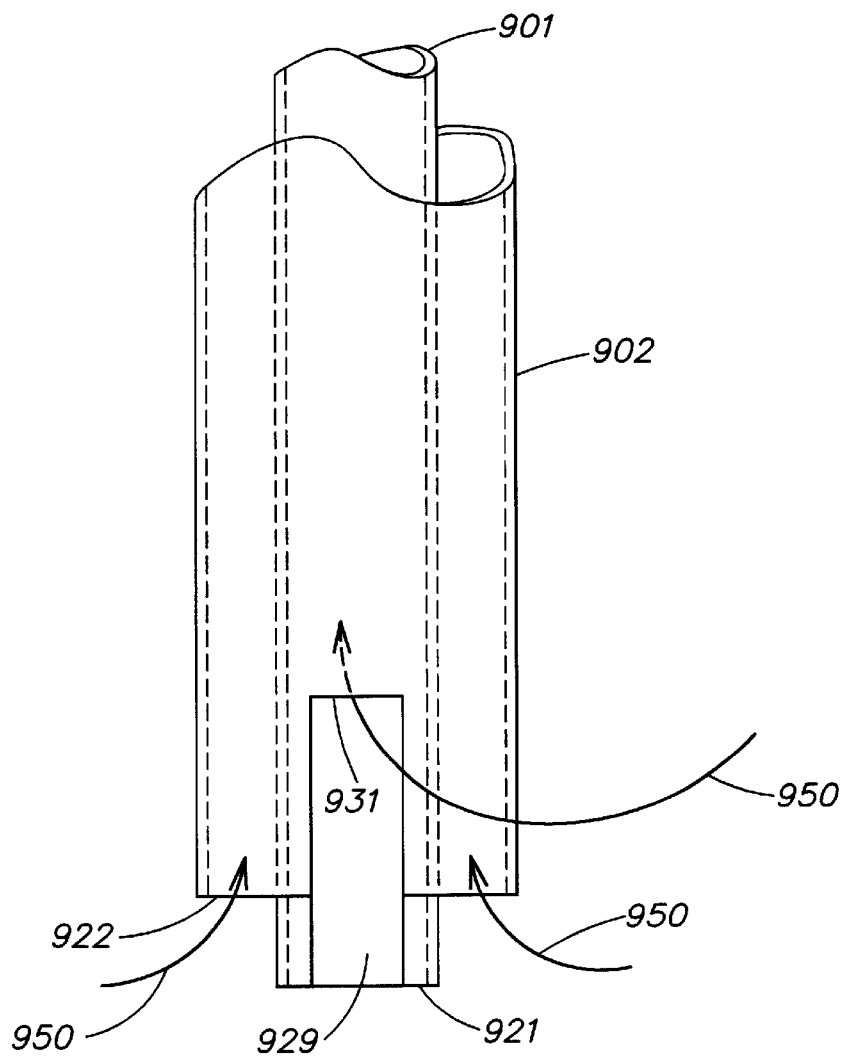
FIG. 9C is a cross-sectional side view of the mixture-expelling conduits of the waterlift silencer of FIG. 9B.

For example, FIGS. 9A–9C show one implementation in which a smaller mixture-expelling conduit 901 is disposed within, but not concentrically aligned with, a larger mixture-expelling conduit 902. FIG. 9A is a cross-sectional side view showing fluid mixture 950 entering a holding chamber 904 through an inlet pipe 905. As more clearly seen in the cross-sectional top view of FIG. 9B, conduit 901 is disposed non-concentrically against conduit 902 so that a portion of the exterior of conduit 901 adjoins the interior of conduit 902. An opening 929 in the bottom portion of conduit 901, shown also in the cross-sectional side view of FIG. 9C, extends through the abutting portion of the wall of conduit 902. In this implementation, a sealing material 980 is applied around the perimeter of opening 929 and between the exterior of conduit 902 and the interior of conduit 901. Thus, fluid mixture 950 may flow from holding chamber 904, through opening 929, into conduit 901 but not into conduit 902. The top 931 of opening 929 is disposed at a greater height above the bottom surface 990 of chamber 904 than is the open bottom 922 of conduit 902. Thus, conduit 901 is sequentially operative for carrying a fluid mixture of exhaust gas and entrained liquid coolant droplets at a gas volume flow rate (or engine speed) that is less than that at which conduit 902 is operative.

In the illustrated embodiment, conduit 901 also has an open bottom 921 that is disposed at a height above bottom surface 990 that is less than that of open bottom 922 of conduit 902. As noted with respect to the similar slot arrangement of conduit 601 with relation to the larger conduit 602, many configurations are possible of the dimensions of opening 929 and the heights of bottoms 921 and 922. Sealing material 980 may be chosen so that it also serves to bond conduit 901 to conduit 902 along any or all adjoining portions of the exterior of conduit 901 and the interior of conduit 902. For example, silicone, epoxy, vinyl ester resin, or any other of a variety of known sealing and bonding materials appropriate for use in an aqueous environment, may be used.

The exemplary embodiments described with respect to FIGS. 4 through 9C include mixture-expelling conduits that are automatically sequentially operative based generally on the height of openings in the conduits with respect to each other and with respect to the bottom surface of the holding chamber. As has been described, back pressure is limited by various arrangements of these heights and of the dimensions and arrangements of the openings. The present invention is not so limited, however. Rather, many types of sensors and/or actuators may be used to sequentially operate two or more mixture-expelling conduits in order to limit back pressure in the manner described above.

Figure 10A:
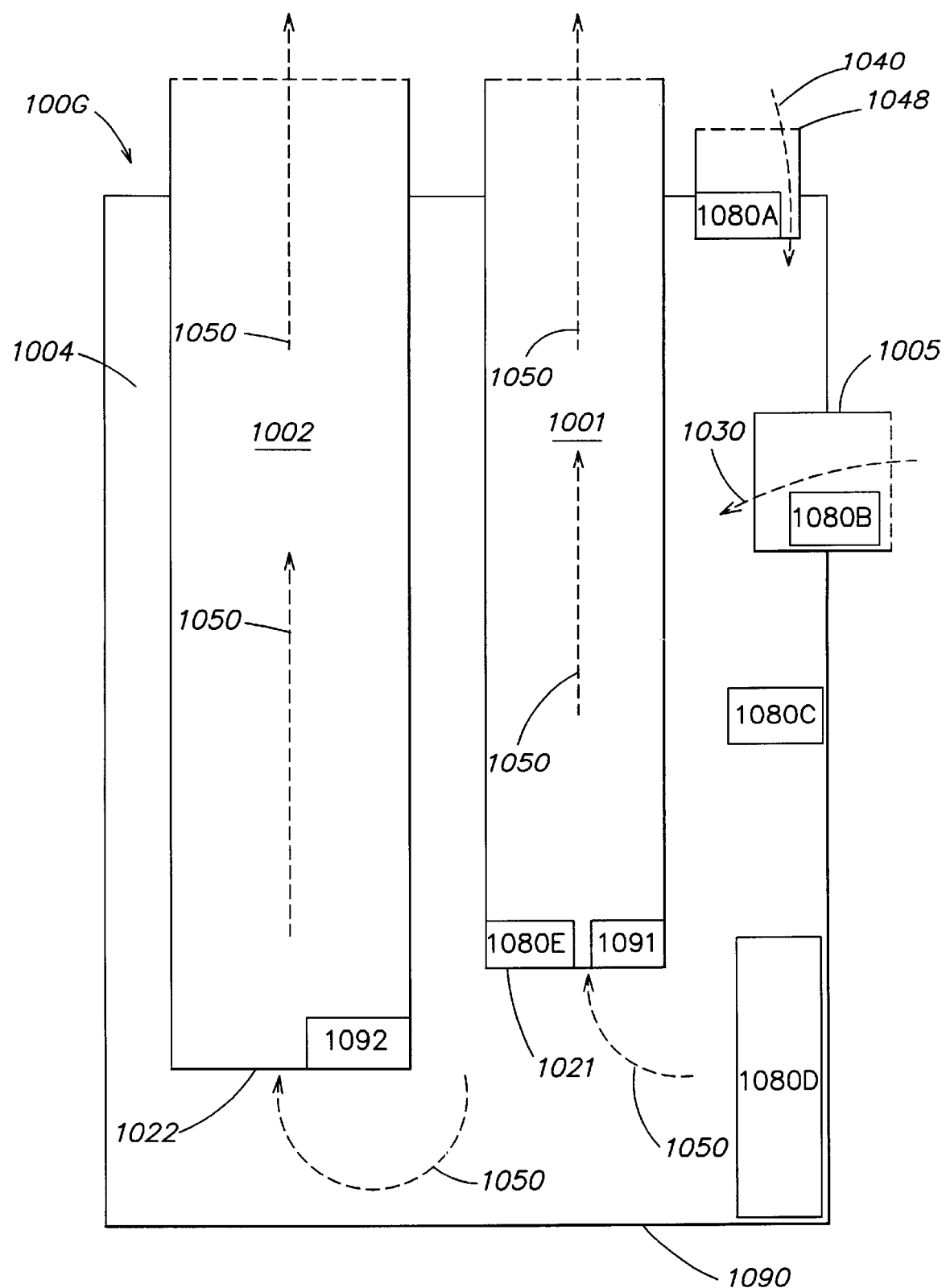
FIG. 10A is a partially schematic, cross-sectional side view of one embodiment of a waterlift silencer in accordance with the present invention including an illustrative arrangement of sensors and actuators.

FIG. 10A is a partially schematic, cross-sectional side view of a waterlift silencer 100G. In the illustrated implementation, liquid coolant and exhaust gas enter a holding chamber 1004 through separate inlet pipes, although it will be understood that a fluid mixture of coolant and gas may enter through a single inlet pipe in alternative implementations. More specifically, in the illustrated implementation, liquid coolant 1030 enters holding chamber 1004 through a liquid-coolant inlet pipe 1005. Exhaust gas 1040 enters holding chamber 1004 through an exhaust-gas inlet pipe 1048.

Silencer 100G includes conduit actuators 1091 and 1092 used respectively to sequentially operate smaller mixture-expelling conduit 1001 and larger mixture-expelling conduit 1002. That is, actuators 1091 and 1092 are any of a variety of known devices, or devices that may be developed in the future, that, when activated in accordance with any known or future technique, enable exhaust gas to rush through open bottoms 1021 and 1022 of conduits 1001 and 1002, respectively, thereby partially atomizing droplets of coolant 1030 in a fluid mixture that is lifted up through the conduits. It will be understood that, in alternative implementations, various configurations of slots, openings, multiple conduits beyond two, conduits disposed within conduits, and so on, may be used, and that the configuration shown in FIG. 10A is illustrative only. It will also be understood that the illustrated placements of actuators 1091 and 1092 are schematic only and not intended to be limiting in any manner. Also, in some implementations, there need not be an actuator 1091 as conduit 1001 may be constantly operative.

Waterlift silencer 100G further includes an illustrative arrangement of various types of silencer sensors 1080A–1080E, generally and collectively referred to as sensors 1080. As specified in greater detail below, sensors 1080 are any of a variety of known or future devices that measure, directly or indirectly, an operating variable of waterlift silencer 100G. An operating variable may be exhaust gas flow velocity, static gas pressure, dynamic gas pressure, back pressure, liquid coolant volume flow rate, exhaust gas volume flow rate, free-surface height of the fluid mixture in the holding chamber, other variables, or any combination thereof. It will be understood that, typically, multiple types of sensors need not be used in a particular silencer, although they may be for redundancy or other reasons. It further will be understood that the illustrated placements of sensors 1080 are schematic only and not intended to be limiting in any manner. The sensors need not be disposed within holding chamber 1004; they may be disposed on or outside of it. As used herein with respect to sensors 1080, the term "measure" and its grammatical variants refers to any technique for directly or indirectly measuring, sensing, inferring, extrapolating, interpolating, or otherwise determining or approximating a value of that which is to be measured.

Sensor 1080A may be any of a variety of known or future devices that are capable of measuring the velocity and/or volume of exhaust gas 1040 entering holding chamber 1004. Sensor 1080A is disposed within inlet pipe 1048 in the illustrated implementation, but it may be otherwise located in alternative implementations. Similarly, sensor 1080B may be any of a variety of known or future devices that are capable of measuring the velocity and/or volume of liquid coolant 1030 entering holding chamber 1004. Sensor 1080B is disposed within inlet pipe 1005 in the illustrated implementation, but it may be otherwise located in alternative implementations. In an alternative implementation in which a fluid mixture enters holding chamber 1004 through a single inlet pipe, a sensor may similarly be provided to measure the velocity and/or volume of the mixture, or of components of it, entering holding chamber 1004.

Sensor 1080C is any known or future sensor that is capable of measuring the static pressure in the top portion of holding chamber 1004, and/or of measuring the back pressure exerted on the engine to which silencer 100G is connected. Sensor 1080D is any known or future sensor that is capable of measuring the free surface height of fluid mixture 1050 above bottom surface 1090 of holding chamber 1004. Sensor 1080E is any known or future sensor that is capable of measuring dynamic pressure, or dynamic effects. This sensor is illustratively placed at the opening to conduit 1001 so that, at a predetermined value of dynamic pressure at the opening to conduit 1001, conduit 1002 may be made operative by actuator 1092.

Figure 10B:
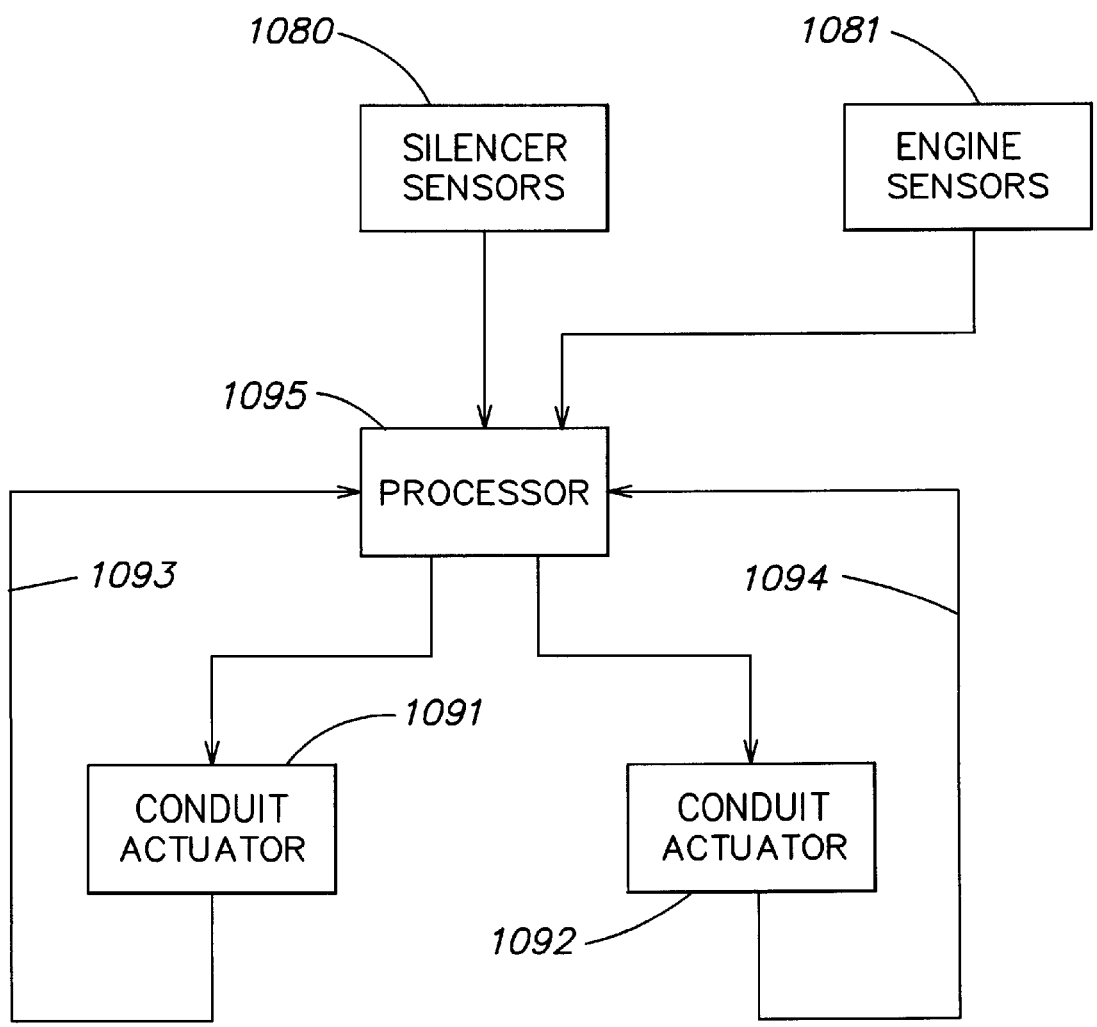
FIG. 10B is a schematic representation of the sensors and actuators of FIG. 10A coupled to a processor for sequentially operating the actuators.

FIG. 10B is a schematic representation of a system for processing the information measured by sensors 1080, and by optional engine sensors 1081, so that actuators 1091 and 1092 may be sequentially activated, thus sequentially operating conduits 1001 and 1002. Processor 1095 may be any known or future device for processing information, whether based on electrical, mechanical, optical, or other processes. For example, processor 1095 may be any of a variety of known, or later to be developed, microprocessors or computers. Processor 1095, in accordance with known techniques, receives measurements from one or more of sensors 1080. Processor 1095 may similarly receive measurements from one or more engine sensors 1081, which may include any of a variety of known devices, or devices that may be developed in the future, for measuring engine speed or back pressure on the engine.

Using information from sensors 1080 and/or 1081, processor 1095 determines when actuators 1091 and/or 1092 should be activated so that the total effective cross-sectional areas of conduits 1001 and/or 1002 (or of additional conduits in alternative implementations) are suitable for limiting back pressure in the manner described above. Activators 1091 and/or 1092 may be designed to partially open or close coverings over openings in conduits 1001 and/or 1002, under the direction of processor 1095, in order to provide additional control over the effective cross-sectional area presented by the conduits. For example, sensor 1080D may measure the free surface level of fluid mixture 1050 in holding chamber 1004 and determine that it is just below the height of bottom 1021 of conduit 1001 above bottom surface 1090. Processor 1095 receives this information and, in accordance with any known technique such as comparing this height to a look-up table of heights for activating conduits 1001 or 1002, may send a signal to actuator 1091 causing it to open, or partially open, a covering (not shown) over open bottom 1021. As sensor 1080D measures the lowering of the free surface level of fluid mixture 1050 as a result of an increase in dynamic pressure in the top portion of holding chamber 1004, processor 1095 causes actuator 1091 to increase the amount of bottom 1021 that is open, thereby increasing the effective cross-sectional area of conduit 1001. When sensor 1080D determines that the free surface level is just below the height of open bottom 1022 of conduit 1002, processor 1095 may cause actuator 1092 to open, or partially open, a covering (not shown) over open bottom 1022. As will now be evident to those skilled in the relevant arts, information from various other types of sensors 1080 or 1081 may similarly be used by processor 1095 to sequentially operate, or partially operate, conduits 1001 and/or 1002.

In some implementations, processor 1095 may employ feedback information in accordance with known techniques to adjust the control signals that it sends to actuators 1091 and/or 1092. The flow of this feedback information from actuators 1091 and 1092 back to processor 1095 is represented in FIG. 10B by feedback signals 1093 and 1094, respectively.

Figure 11:
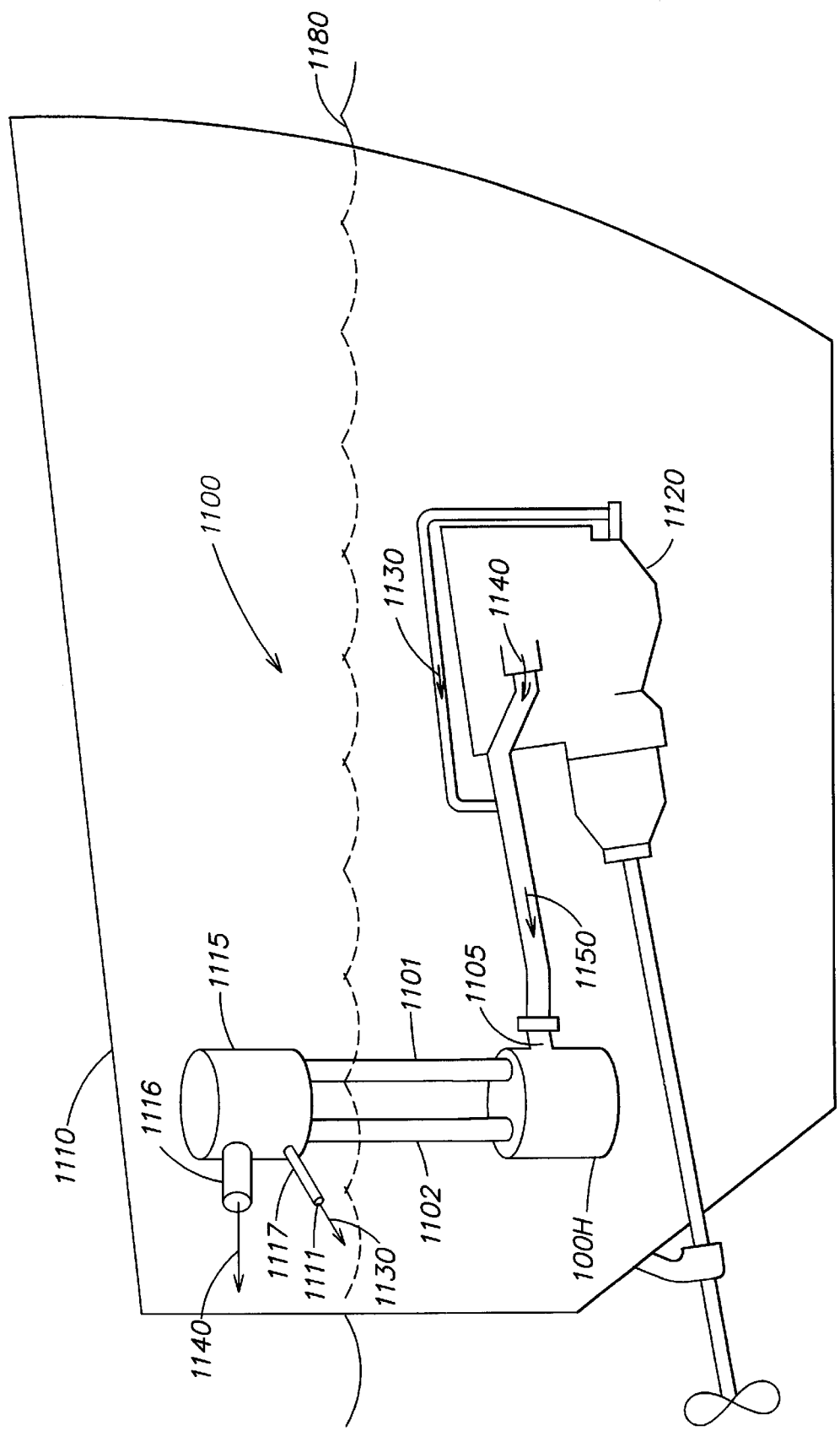
FIG. 11 is a schematic representation of one embodiment of an assembly including a waterlift silencer, secondary silencer and/or separator, and engine in accordance with the present invention, disposed within a marine vessel.

FIG. 11 is a schematic representation of one embodiment of an assembly 1100 in accordance with the present invention that includes waterlift silencer 100H, secondary silencer and/or separator 1115, and engine 1120. Assembly 1100 is disposed within a marine vessel 1110. Liquid coolant 1130 mixes with exhaust gas 1140 and the fluid mixture 1150 enters silencer 100H through an inlet pipe 1105. As described above with respect to various implementations of waterlift silencers 100, mixture-expelling conduits 1101 and 1102 lift fluid mixture 1150 above waterline 1180 and into secondary silencer and/or separator 1115 (hereafter, simply "secondary device 1115"). Secondary device 1115 may be any of a variety of known devices for reducing the acoustic energy of fluid mixture 1150 or a component of it, or a device to perform this function that is developed in the future. Also, secondary device 1115 may be any of a variety of known devices for separating liquid coolant 1 130 and exhaust gas 1140 from fluid mixture 1150, or a device to perform this function that is developed in the future. Alternatively, secondary device 1115 may be a device that performs both of these functions. If secondary device 1115 performs the separating function, separate exhaust tubes 1116 and 1117 may be provided through which exhaust gas 1140 and liquid coolant 1130, respectively, may be expelled from vessel 1110. Typically, liquid coolant 1130 is expelled through a coolant-exhaust port such as port 1111 in vessel 1110 that is above waterline 1180. In alternative implementations, exhaust gas 1140 and liquid coolant 1130 may be expelled through a single exhaust tube and port (not shown). In yet other implementations, secondary device 1115, or a secondary silencer and/or separator in addition to secondary device 1115, may be disposed between engine 1120 and waterlift silencer 100H. In any of these implementations, secondary device 1115 and/or an additional secondary silencer and/or separator may be separate devices rather than the single device shown in FIG. 11.

Having now described various embodiments and implementations of the present invention, it should be apparent to those skilled in the relevant art that the foregoing is illustrative only and not limiting, having been presented by way of example only. Numerous other embodiments, and modifications thereof, are contemplated as falling within the scope of the present invention as defined by appended claims and equivalents thereto.

What is claimed is:

1. A waterlift silencer for reducing the acoustic energy of a fluid mixture of a liquid coolant and of exhaust gas from an engine comprising:

a holding chamber that holds the fluid mixture:

a first mixture-expelling conduit for dynamically lifting the fluid mixture above the silencer, the first mixture-expelling conduit having a bottom portion disposed within the holding chamber;

a second mixture-expelling conduit for dynamically lifting the fluid mixture above the silencer, the second mixture-expelling conduit having a bottom portion disposed within the holding chamber;

means for sequentially operating the first and second mixture-expelling conduits; and the means for sequentially operating is constructed and arranged so that the first mixture-expelling conduit is dynamically operative when the engine is operated within a first range of operating speeds, and the second mixture-expelling conduit is dynamically operative when the engine is operated within a second range of operating speeds having a threshold speed below which the second mixture-expelling conduit is not dynamically operative.

2. The silencer of claim 1, wherein:

the second range of operating speeds is a subset of the first range of operating speeds.

3. The silencer of claim 2, wherein:

the first and second ranges are substantially coextensive above the threshold speed.

4. A waterlift silencer for reducing the acoustic energy of a fluid mixture of a liquid coolant and of exhaust gas from an engine comprising:

a holding chamber that holds the fluid mixture, a first mixture-expelling conduit for dynamically lifting the fluid mixture above the silencer, the first mixtur-expelling conduit having a bottom portion disposed within the holding chamber;

a second mixture-expelling conduit for dynamically lifting the fluid mixture above the silencer, the second mixture-expelling conduit having a bottom portion disposed within the holding chamber;

means for sequentially operating the first and second mixture-expelling conduits;

the first mixture-expelling conduit has an opening in its bottom portion;

the second mixture-expelling conduit has an opening in its bottom portion; and the means for sequentially operating is constructed and arranged so that the first mixture-expelling conduit is dynamically operative when the exhaust gas has a velocity at the opening of the first mixture-expelling conduit within a first range of exhaust gas flow velocities, and the second mixture-expelling conduit is dynamically operative when the exhaust gas has a velocity at the opening of the first mixture-expelling conduit within a second range of exhaust gas flow velocities including a threshold velocity below which the second mixture-expelling conduit is not dynamically operative.

5. The silencer of claim 4, wherein:

the second range of exhaust gas flow velocities is a subset of the first range of exhaust gas flow velocities.

6. A waterlift silencer for reducing the acoustic energy of a fluid mixture of a liquid coolant and of exhaust gas from an engine, comprising:

a holding chamber that holds the fluid mixture;

a first mixture-expelling conduit for dynamically lifting the fluid mixture above the silencer the first mixture-expelling conduit having a bottom portion disposed within the holding chamber;

a second mixture-expelling conduit for dynamically lifting the fluid mixture above the silencer, the second mixture-expelling conduit having a bottom portion disposed within the holding chamber;

means for sequentially operating the first and second mixture-expelling conduits; and the means for sequentially operating is constructed and arranged so that the first mixture-expelling conduit is dynamically operative within a first range of static gas pressures in the holding chamber, and the second mixture-expelling conduit is dynamically operative within a second range of static gas pressures in the holding chamber, including a threshold static gas pressure below which the second mixture-expelling conduit is not dynamically operative.

7. The silencer of claim 6, wherein:

the second range of static gas pressures is a subset of the first range of static gas pressures.

8. The silencer of claim 7, wherein:

the first and second ranges are substantially coextensive above the threshold static gas pressure.

9. A waterlift silencer for reducing the acoustic energy of a fluid mixture of a liquid coolant and of exhaust gas from an engine, comprising:

a holding chamber that holds the fluid mixture;

a first mixture-expelling conduit for dynamically lifting the fluid mixture above the silencer the first mixture-expelling conduit having a bottom portion disposed within the holding chamber;

a second mixture-expelling conduit for dynamically lifting the fluid mixture above the silencer, the second mixture-expelling conduit having a bottom portion disposed within the holding chamber;

means for sequentially operating the first and second mixture-expelling conduits;

the bottom portion of the first mixture-expelling conduit has an opening;

the bottom portion of the second mixture-expelling conduit has an opening; and the means for sequentially operating is constructed and arranged so that the first mixture-expelling conduit is dynamically operative within a first range of dynamic gas pressures at the opening of the bottom portion of the first mixture-expelling conduit, and the second mixture-expelling conduit is dynamically operative within a second range of dynamic gas pressures at the opening of the bottom portion of the first mixture-expelling conduit, including a threshold dynamic gas pressure below which the second mixture-expelling conduit is not dynamically operative.

10. The silencer of claim 9, wherein:

the second range of dynamic gas pressures is a subset of the first range of dynamic gas pressures.

11. The silencer of claim 10, wherein:

the first and second ranges are substantially coextensive above the threshold dynamic gas pressure.

12. A waterlift silencer for reducing the acoustic energy of a fluid mixture of a liquid coolant and of exhaust gas from an engine comprising:

a holding chamber that holds the fluid mixture;

a first mixture-expelling conduit for dynamically lifting the fluid mixture above the silencer, the first mixture-expelling conduit having a bottom portion disposed within the holding chamber;

a second mixture-expelling conduit for dynamically lifting the fluid mixture above the silencer, the second mixture-expelling conduit having a bottom portion disposed within the holding chamber;

means for sequentially operating the first and second mixture-expelling conduits;

the means for sequentially operating is constructed and arranged so that the first mixture-expelling conduit is dynamically operative when a first range of back pressure is present at the engine, and the second mixture-expelling conduit is dynamically operative when a second range of back pressure is present at the engine, including a threshold back pressure below which the second mixture-expelling conduit is not dynamically operative.

13. The silencer of claim 12, wherein:

the second range of back pressures is a subset of the first range of back pressures.

14. The silencer of claim 13, wherein:

the first and second ranges are substantially coextensive above the threshold back pressure.

15. The silencer of claim 12, wherein:

the first and second ranges are selected so that each value of back pressure within both ranges is substantially within normal back pressure operating limits for the engine at its normal engine operating speeds.

16. A waterlift silencer for reducing the acoustic energy of a fluid mixture of a liquid coolant and of exhaust gas from an enginecomprising:

a holding chamber that holds the fluid mixture;

a first mixture-expelling conduit for dynamically lifting the fluid mixture above the silencer, the first mixture-expelling conduit having a bottom portion disposed within the holding chamber;

a second mixture-expelling conduit for dynamically lifting the fluid mixture above the silencer, the second mixture-expelling conduit having a bottom portion disposed within the holding chamber;

means for sequentially operating the first and second mixture-expelling conduits; and the means for sequentially operating is constructed and arranged so that the first mixture-expelling conduit is dynamically operative when the liquid coolant has a volume flow rate into the holding chamber that is within a first range of flow rates, and the second mixture-expelling conduit is dynamically operative when the liquid coolant has a volume flow rate into the holding chamber that is within a second range of flow rates including a threshold flow rate below which the second mixture-expelling conduit is not dynamically operative.

17. The silencer of claim 16, wherein:

the second range of flow rates is a subset of the first range of flow rates.

18. The silencer of claim 17, wherein:

the first and second ranges are substantially coextensive above the threshold flow rates.

19. The silencer of claim 17, wherein:

the first and second ranges are substantially coextensive above the threshold flow rates.

20. The silencer of claim 16, wherein:

the second range of flow rates is a subset of the first range of flow rates.

21. A waterlift silencer for reducing the acoustic energy of a fluid mixture of a liquid coolant and of exhaust gas from an engine, comprising:

a holding chamber that holds the fluid mixture;

a first mixture-expelling conduit for dynamically lifting the fluid mixture above the silencer the first mixture-expelling conduit having a bottom portion disposed within the holding chamber;

a second mixture-expelling conduit for dynamically lifting the fluid mixture above the silencer, the second mixture-expelling conduit having a bottom portion disposed within the holding chamber;

means for sequentially operating the first and second mixture-expelling conduits; and the means for sequentially operating is constructed and arranged so that the first mixture-expelling conduit is dynamically operative when the exhaust gas has a volume flow rate into the holding chamber that is within a first range of flow rates, and the second mixture-expelling conduit is dynamically operative when the exhaust gas has a volume flow rate into the holding chamber that is within a second range of flow rates including a threshold flow rate below which the second mixture-expelling conduit is not dynamically operative.

22. A waterlift silencer for reducing the acoustic energy of a fluid mixture of a liquid coolant and of exhaust gas from an engine comprising:

a holding chamber that holds the fluid mixture;

a first mixture-expelling conduit for dynamically lifting the fluid mixture above the silencer, the first mixture-expelling conduit having a bottom portion disposed within the holding chamber;

a second mixture-expelling conduit for dynamically lifting the fluid mixture above the silencer, the second mixture-expelling conduit having a bottom portion disposed within the holding chamber;

means for sequentially operating the first and second mixture-expelling conduits; and the means for sequentially operating is constructed and arranged so that the first mixture-expelling conduit is dynamically operative in response to combined effects of a first plurality of sets of values of liquid coolant volume flow rate and exhaust gas volume flow rate into the holding chamber, and the second mixture-expelling conduit is dynamically operative in response to combined effects of a second plurality of sets of values of liquid coolant volume flow rate and exhaust gas volume flow rate into the holding chamber, wherein at least one of the first plurality of sets of values is not the same as any of the second plurality of sets of values and wherein at least one of the second plurality of sets of values is the same as one of the first plurality of sets of values.

23. A waterlift silencer for reducing the acoustic energy of a fluid mixture of a liquid coolant and of exhaust gas from an engine, comprising:

a holding chamber that holds the fluid mixture;

a first mixture-expelling conduit for dynamically lifting the fluid mixture above the silencer, the first mixture-expelling conduit having a bottom portion disposed within the holding chamber;

a second mixture-expelling conduit for dynamically lifting the fluid mixture above the silencer, the second mixture-expelling conduit having a bottom portion disposed within the holding chamber;

means for sequentially operating the first and second mixture-expelling conduits;

the holding chamber has a bottom surface; and the means for sequentially operating is constructed and arranged so that the first mixture-expelling conduit is dynamically operative when the fluid mixture has a free-surface height above the bottom surface of the holding chamber that is within a first range of heights, and the second mixture-expelling conduit is dynamically operative when the fluid mixture has a free-surface height above the bottom surface of the holding chamber that is within a second range of heights including a threshold height above which the second mixture-expelling conduit is not dynamically operative.

24. The silencer of claim 23, wherein:

the second range of heights is a subset of the first range of heights.

25. The silencer of claim 24, wherein:

the first and second ranges are substantially coextensive below the threshold height.

26. A waterlift silencer for reducing the acoustic energy of a fluid mixture of a liquid coolant and of exhaust gas from an engine, comprising:

a holding chamber that holds the fluid mixture;

a first mixture-expelling conduit for dynamically lifting the fluid mixture above the silencer, the first mixture-expelling conduit having a bottom portion disposed within the holding chamber;

a second mixture-expelling conduit for dynamically lifting the fluid mixture above the silencer, the second mixture-expelling conduit having a bottom portion disposed within the holding chamber;

means for sequentially operating the first and second mixture-expelling conduits; one or more additional mixture-expelling conduits for dynamically lifting the fluid mixture above the silencer, each having a bottom portion disposed within the holding chamber; and means for sequentially operating each of the additional mixture-expelling conduits.

27. A waterlift silencer for reducing the acoustic energy of a fluid mixture of a liquid coolant and of exhaust gas from an engine, comprising:

a holding chamber that holds the fluid mixture;

a first mixture-expelling conduit for dynamically lifting the fluid mixture above the silencer, the first mixture-expelling conduit having a bottom portion disposed within the holding chamber;

a second mixture-expelling conduit for dynamically lifting the fluid mixture above the silencer, the second mixture-expelling conduit having a bottom portion disposed within the holding chamber;

means for sequentially operating the first and second mixture-expelling conduits;

the first mixture-expelling conduit is dynamically operative when the engine is operated above a first threshold engine speed; and the second mixture-expelling conduit is dynamically operative only when the engine is operated above a second threshold engine speed that is greater than the first threshold engine speed.

28. The silencer of claim 27, further comprising:

a third mixture-expelling conduit for dynamically lifting the fluid mixture above the silencer, the third mixture-expelling conduit having a bottom portion disposed within the holding chamber;

wherein the third mixture-expelling conduit is dynamically operative only when the engine is operated above a third threshold engine speed, wherein the third threshold engine speed is greater than the second threshold engine speed.

29. The silencer of claim 28, further comprising:

one or more additional mixture-expelling conduits for dynamically lifting the fluid mixture above the silencer, each having a bottom portion disposed within the holding chamber;

wherein each of the additional mixture-expelling conduits has a corresponding threshold engine speed only above which it is dynamically operative.

30. The silencer of claim 29, wherein:

each corresponding threshold engine speed of the additional mixture-expelling conduits is different from each other corresponding threshold engine speed of the other additional mixture-expelling conduits and from the first, second, and third threshold engine speeds.

31. A waterlift silencer for reducing the acoustic energy of a fluid mixture of a liquid coolant and of exhaust gas from an engine, comprising:

a holding chamber that holds the fluid mixture the holding chamber having a bottom surface;

a first mixture-expelling conduit for dynamically lifting the fluid mixture above the silencer, the first mixture-expelling conduit having a bottom portion disposed within the holding chamber; and a second mixture-expelling conduit for dynamically lifting the fluid mixture above the silencer, the second mixture-expelling conduit having a bottom portion disposed within the holding chamber; wherein the first mixture-expelling conduit has a first opening in its bottom portion that is disposed at least at a first height above the bottom surface of the holding chamber, wherein the first height is the greatest height of any height of the first opening of the first mixture-expelling conduit above the bottom surface of the holding chamber;

the second mixture-expelling conduit has a first opening in its bottom portion that is disposed at least at a second height above the bottom surface of the holding chamber, wherein the second height is the greatest height of any height of the first opening of the second mixture-expelling conduit above the bottom surface of the holding chamber;

the first height is greater than the second height;

the bottom portion of the first mixture-expelling conduit has a cross-sectional area, and the bottom portion of the second mixture-expelling conduit has a cross-sectional area that is substantially equal to, or greater than, the cross-sectional area of the bottom portion of the first mixture-expelling conduit.

32. The silencer of claim 31, wherein:

the bottom portion of the first mixture-expelling conduit is disposed within the bottom portion of the second mixture-expelling conduit.

33. The silencer of claim 32, wherein:

the first mixture-expelling conduit is disposed within the second mixture-expelling conduit.

34. The silencer of claim 33, wherein:

the bottom portions of the first and second mixture-expelling conduits have inner and outer surfaces; and a portion of the outer surface of the bottom portion of the first mixture-expelling conduit is disposed adjacent to a portion of the inner surface of the bottom portion of the second mixture-expelling conduit.

35. The silencer of claim 32, wherein:

the bottom portions of the first and second mixture-expelling conduits are coaxially aligned with respect to each other.

36. The silencer of claim 32, wherein:

the second mixture-expelling conduit has a second opening in its bottom portion, and the silencer further comprises:

an interior-connecting conduit that passes through the second opening and has a first end fluidly connected to the first opening of the first mixture-expelling conduit and a second end disposed outside of the second mixture-expelling conduit and within the holding chamber, wherein the interior-connecting conduit is sealed with respect to the second opening so that the fluid mixture does not substantially enter the second mixture-expelling conduit through the second opening.

37. The silencer of claim 36, wherein:

the second end of the interior-connecting conduit has a top portion that is disposed at a height above the bottom surface of the holding chamber that is substantially equal to the first height.

38. A waterlift silencer for reducing the acoustic energy of a fluid mixture of a liquid coolant and of exhaust gas froth an engine comprising:

a holding chamber that holds the fluid mixture the holding chamber having a bottom surface;

a first mixture-expelling conduit for dynamically lifting the fluid mixture above the silencer, the first mixture-expelling conduit having a bottom portion disposed within the holding chamber; and a second mixture-expelling conduit for dynamically lifting the fluid mixture above the silencer, the second mixture-expelling conduit having a bottom portion disposed within the holding chamber; wherein the first mixture-expelling conduit has a first opening in its bottom portion that is disposed at least at a first height above the bottom surface of the holding chamber, wherein the first height is the greatest height of and height of the first opening of the first mixture-expelling conduit above the bottom surface of the holding chamber;

the second mixture-expelling conduit has a first opening in its bottom portion that is disposed at least at a second height above the bottom surface of the holding chamber, wherein the second height is the greatest height of any height of the first opening of the second mixture-expelling conduit above the bottom surface of the holding chamber;

the first height is greater than the second height;

the bottom portion of the first mixture-expelling conduit has an open bottom end that comprises the first opening of the first mixture-expelling conduit;

the bottom portion of the second mixture-expelling conduit has an open bottom end that comprises the first opening of the second mixture-expelling conduit; and the first and second heights are predetermined so that
at a first operating speed of the engine, the fluid mixture has a first free-surface height above the bottom surface of the holding chamber that is not higher than the first height and is higher than the second height; and at a second operating speed of the engine, the fluid mixture has a second free-surface height above the bottom surface of the holding chamber that is lower than or substantially equal to the second height, wherein the second operating speed is greater than the first operating speed.

39. The silencer of claim 38, wherein:

the first and second heights further are predetermined so that at a third operating speed of the engine, the fluid mixture has a third free-surface height above the bottom surface of the holding chamber that is higher than the first and second heights, wherein the third operating speed is less than the first operating speed.

40. A waterlift silencer for reducing the acoustic energy of a fluid mixture of a liquid coolant and of exhaust gas from an engine comprising:

a holding chamber that holds the fluid mixture, the holding chamber having a bottom surface;

a first mixture-expelling conduit for dynamically lifting the fluid mixture above the silencer, the first mixture-expelling conduit having a bottom portion disposed within the holding chamber; and a second mixture-expelling conduit for dynamically lifting the fluid mixture above the silencer, the second mixture-expelling conduit having a bottom portion disposed within the holding chamber; wherein the first mixture-expelling conduit has a first opening in its bottom portion that is disposed at least at a first height above the bottom surface of the holding chamber, wherein the first height is the greatest height of any height of the first opening of the first mixture-expelling conduit above the bottom surface of the holding chamber;

the second mixture-expelling conduit has a first opening in its bottom portion that is disposed at least at a second height above the bottom surface of the holding chamber, wherein the second height is the greatest height of any height of the first opening of the second mixture-expelling conduit above the bottom surface of the holding chamber;

the first height is greater than the second height;

the bottom portion of the second mixture-expelling conduit has an open bottom end that comprises the first opening of the second mixture-expelling conduit; and the first opening of the first mixture-expelling conduit comprises at least one slot that extends downward from the first height to a third height above the bottom surface of the holding chamber, wherein the third height is less than the second height.

41. A waterlift silencer for reducing the acoustic energy of a fluid mixture of a liquid Coolant and of exhaust gas from an engine, comprising:

a holding chamber that holds the fluid mixture;

a first mixture-expelling conduit for dynamically lifting the fluid mixture above the silencer;

a second mixture-expelling conduit for dynamically lifting the fluid mixture above the silencer;

at least one silencer sensor for sensing at least one operating variable of the waterlift silencer;

at least one conduit actuator for operating, when actuated, at least one of the first and second mixture-expelling conduits for dynamically lifting the fluid mixture from the holding chamber;

a processor, coupled to the at least one silencer sensor and the at least one conduit actuator, for processing at least one signal from the at least one silencer sensor and sequentially actuating the at least one conduit actuator based on the processed at least one signal.

42. A waterlift silencer for reducing the acoustic energy of a fluid mixture of a liquid coolant and of exhaust gas from an engine, comprising:

a holding chamber that holds the fluid mixture;

a first mixture-expelling conduit for dynamically lifting the fluid mixture above the silencer;

a second mixture-expelling conduit for dynamically lifting the fluid mixture above the silencer;

at least one engine sensor for sensing at least one operating variable of the engine;

at least one conduit actuator for operating, when actuated, at least one of the first and second mixture-expelling conduits to dynamically lift the fluid mixture above the silencer;

a processor, coupled to the at least one engine sensor and the at least one conduit actuator, for processing at least one signal from the at least one engine sensor and sequentially actuating the at least one conduit actuator based on the processed at least one signal.

43. A silencer assembly for reducing the acoustic energy of a fluid mixture of a liquid coolant and of exhaust gas from an engine, comprising:

(1) a waterlift silencer, comprising a holding chamber that holds the fluid mixture, a first mixture-expelling conduit for dynamically lifting the fluid mixture above the silencer, the first mixture-expelling conduit having a bottom portion disposed within the holding chamber, a second mixture-expelling conduit for dynamically lifting the fluid mixture above the silencer, the second mixture-expelling conduit having a bottom portion disposed within the holding chamber, and means for sequentially operating the first and second mixture-expelling conduits; and (2) a secondary silencer, comprising
at least one inflow port fluidly connected to at least one of the first and second mixture-expelling conduits for receiving the fluid mixture from the first and second mixture-expelling conduits,
silencing means constructed and arranged to further reduce the acoustic energy of the fluid mixture, and
at least one outflow port through which the fluid mixture is expelled from the secondary silencer.

44. A separator-silencer assembly for reducing the acoustic energy of a fluid mixture of a quid coolant and of exhaust gas from an engine, comprising:
(1) a waterlift silencer, comprising
a holding chamber that holds the fluid mixture,
a first mixture-expelling conduit for dynamically lifting the fluid mixture above the silencer, the first mixture-expelling conduit having a bottom portion disposed within the holding chamber,
a second mixture-expelling conduit for dynamically lifting the fluid mixture above the silencer, the second mixture-expelling conduit having a bottom portion disposed within the holding chamber, and
means for sequentially operating the first and second mixture-expelling conduits; and
(2) a separator-silencer comprising
at least one inflow port fluidly connected to at least one of the first and second mixture-expelling conduits for receiving the fluid mixture from the first and second mixture-expelling conduits,
separating means constructed and arranged to substantially separate the exhaust gas and the liquid coolant from the fluid mixture,
silencing means constructed and arranged to further reduce the acoustic energy of the separated exhaust gas,
recombining means constructed and arranged to recombine the separated exhaust gas and liquid coolant, and
at least one outflow port through which the recombined exhaust gas and liquid coolant are expelled from the separator-silencer.

45. A separator-silencer assembly for reducing the acoustic energy of a fluid mixture of a liquid coolant and of exhaust gas from an engine, comprising:
(1) a waterlift silencer, comprising
a holding chamber that holds the fluid mixture,
a first mixture-expelling conduit for dynamically lifting the fluid mixture above the silencer, the first mixture-expelling conduit having a bottom portion disposed within the holding chamber,
a second mixture-expelling conduit for dynamically lifting the fluid mixture above the silencer, the second mixture-expelling conduit having a bottom portion disposed within the holding chamber, and
means for sequentially operating the first and second mixture-expelling conduits; and
(2) a separator-silencer comprising
at least one inflow port fluidly connected to at least one of the first and second mixture-expelling conduits for receiving the fluid mixture from the first and second mixture-expelling conduits,
separating means constructed and arranged to substantially separate the exhaust gas and the liquid coolant from the fluid mixture,
silencing means constructed and arranged to further reduce the acoustic energy of the separated exhaust gas,
an exhaust-gas outflow port through which the separated exhaust gas is expelled from the separator, and
a coolant outflow port through which the separated liquid coolant is expelled from the separator-silencer.

46. A separator-silencer assembly for reducing the acoustic energy of a fluid mixture of a liquid coolant and of exhaust gas from an engine, comprising:
(1) a waterlift silencer, comprising
a holding chamber that holds the fluid mixture,
a first mixture-expelling conduit for dynamically lifting the fluid mixture above the silencer, the first mixture-expelling conduit having a bottom portion disposed within the holding chamber,
a second mixture-expelling conduit for dynamically lifting the fluid mixture above the silencer, the second mixture-expelling conduit having a bottom portion disposed within the holding chamber, and
means for sequentially operating the first and second mixture-expelling conduits; and
(2) a separator comprising
at least one inflow port fluidly connected to at least one of the first and second mixture-expelling conduits for receiving the fluid mixture from the first and second mixture-expelling conduits,
separating means constructed and arranged to substantially separate the exhaust gas and the liquid coolant from the fluid mixture,
an exhaust-gas outflow port through which the separated exhaust gas is expelled from the separator, and
a coolant outflow port through which the separated liquid coolant is expelled from the separator.

47. A method for reducing the acoustic energy of a fluid mixture of a liquid coolant and of exhaust gas from an engine, comprising steps of:
receiving the fluid mixture in a holding chamber of a silencer;
dynamically lifting the fluid mixture above the silencer through a first mixture-expelling conduit disposed at least in part within the holding chamber;
dynamically lifting the fluid mixture above the silencer through a second mixture-expelling conduit disposed at least in part within the holding chamber; and
sequentially operating the first and second mixture-expelling conduits;
wherein the step of sequentially operating comprises the steps of
dynamically operating the first mixture-expelling conduit when the engine is operated within a first range of operating speeds, and
dynamically operating the second mixture-expelling conduit when the engine is operated within a second range of operating speeds having a threshold speed below which the second mixture-expelling conduit is not dynamically operative.

48. A method for reducing the acoustic energy of a fluid mixture of a liquid coolant and of exhaust gas from an engine, comprising steps of:
receiving the fluid mixture in a holding chamber of a silencer;
dynamically lifting the fluid mixture above the silencer through a first mixture-expelling conduit disposed at least in part within the holding chamber;
dynamically lifting the fluid mixture above the silencer through a second mixture-expelling conduit disposed at least in part within the holding chamber; and sequentially operating the first and second mixture-expelling conduits;
wherein the first mixture-expelling conduit has an opening in its bottom portion;
the second mixture-expelling conduit has an opening in its bottom portion; and the step of sequentially operating comprises the steps of
dynamically operating the first mixture-expelling conduit when the exhaust gas has a velocity at the opening of the first mixture-expelling conduit within a first range of exhaust gas flow velocities, and
dynamically operating the second mixture-expelling conduit when the exhaust gas has a velocity at the opening of the first mixture-expelling conduit within a second range of exhaust gas flow velocities including a threshold exhaust gas flow velocity below which the second mixture-expelling conduit is not dynamically operative.

49. A method for reducing the acoustic energy of a fluid mixture of a liquid coolant and of exhaust gas from an engine comprising steps of:
receiving the fluid mixture in a holding chamber of a silencer;
dynamically lifting the fluid mixture above the silencer through a first mixture-expelling conduit disposed at least in part within the holding chamber;
dynamically lifting the fluid mixture above the silencer through a second mixture-expelling conduit disposed at least in part within the holding chamber; and
sequentially operating the first and second mixture-expelling conduits;
wherein the step of sequentially operating comprises the steps of
dynamically operating the first mixture-expelling conduit within a first range of static gas pressures in the holding chamber, and
dynamically operating the second mixture-expelling conduit within a second range of static gas pressures in the holding chamber, including a threshold static gas pressure below which the second mixture-expelling conduit is not dynamically operative.

50. A method for reducing the acoustic energy of a fluid mixture of a liquid coolant and of exhaust gas from an engine comprising steps of:
receiving the fluid mixture in a holding chamber of a silencer;
dynamically lifting the fluid mixture above the silencer through a first mixture-expelling conduit disposed at least in part within the holding chamber;
dynamically lifting the fluid mixture above the silencer through a second mixture-expelling conduit disposed at least in part within the holding chamber; and
sequentially operating the first and second mixture-expelling conduits;
wherein the bottom portion of the first mixture-expelling conduit has an opening;
the bottom portion of the second mixture-expelling conduit has an opening; and the step of sequentially operating comprises the steps of
dynamically operating the first mixture-expelling conduit within a first range of dynamic gas pressures at the opening of the bottom portion of the first mixture-expelling conduit, and
dynamically operating the second mixture-expelling conduit within a second range of dynamic gas pressures at the opening of the bottom portion of the first mixture-expelling conduit, including a threshold dynamic gas pressure below which the second mixture-expelling conduit is not dynamically operative.

51. A method for reducing the acoustic energy of a fluid mixture of a liquid coolant and of exhaust gas from an engine comprising steps of:
receiving the fluid mixture in a holding chamber of a silencer;
dynamically lifting the fluid mixture above the silencer through a first mixture-expelling conduit disposed at least in part within the holding chamber;
dynamically lifting the fluid mixture above the silencer through a second mixture-expelling conduit disposed at least in Dart within the holding chamber; and
sequentially operating the first and second mixture-expelling conduits;
wherein the step of sequentially operating comprises the steps of
dynamically operating the first mixture-expelling conduit when a first range of back pressure is present at the engine, and
dynamically operating the second mixture-expelling conduit when a second range of back pressure is present at the engine, including a threshold back pressure below which the second mixture-expelling conduit is not dynamically operative.

52. The method of claim 51, wherein:
the step of sequentially operating further comprises the step of selecting the first and second ranges so that each value of back pressure within both ranges is substantially within normal back pressure operating limits for the engine at its normal engine operating speeds.

53. A method for reducing the acoustic energy of a fluid mixture of a liquid coolant and of exhaust gas from an engine, comprising steps of:
receiving the fluid mixture in a holding chamber of a silencer;
dynamically lifting the fluid mixture above the silencer through a first mixture-expelling conduit disposed at least in part within the holding chamber;
dynamically lifting the fluid mixture above the silencer through a second mixture-expelling conduit disposed at least in part within the holding chamber; and
sequentially operating the first and second mixture-expelling conduits;
wherein the step of sequentially operating comprises the steps of
dynamically operating the first mixture-expelling conduit when the liquid coolant has a flow rate into the holding chamber that is within a first range of flow rates, and
dynamically operating the second mixture-expelling conduit when the liquid coolant has a flow rate into the holding chamber that is within a second range of flow rates including a threshold flow rate below which the second mixture-expelling conduit is not dynamically operative.

54. A method for reducing the acoustic energy of a fluid mixture of a liquid coolant and of exhaust gas from an engine comprising steps of:
receiving the fluid mixture in a holding chamber of a silencer;
dynamically lifting the fluid mixture above the silencer through a first mixture-expelling conduit disposed at least in part within the holding chamber;

dynamically lifting the fluid mixture above the silencer through a second mixture-expelling conduit disposed at least in part within the holding chamber; and sequentially operating the first and second mixture-expelling conduits;

wherein the holding chamber has a bottom surface; and the step of sequentially operating comprises the steps of
dynamically operating the first mixture-expelling conduit when the fluid mixture has a free-surface height above the bottom surface of the holding chamber that is within a first range of heights, and
dynamically operating the second mixture-expelling conduit when the fluid mixture has a free-surface height above the bottom surface of the holding chamber that is within a second range of heights including a threshold height above which the second mixture-expelling conduit is not dynamically operative.

55. A method for reducing the acoustic energy of a fluid mixture of a liquid coolant and of exhaust gas from an engines, comprising steps of:

receiving the fluid mixture in a holding chamber of a silencer;

dynamically lifting the fluid mixture above the silencer through a first mixture-expelling conduit disposed at least in part within the holding chamber;

dynamically lifting the fluid mixture above the silencer through a second mixture-expelling conduit disposed at least in part within the holding chamber;

sequentially operating the first and second mixture-expelling conduits;

receiving the fluid mixture from the first and second mixture-expelling conduits in a secondary silencer;

reducing the acoustic energy of the fluid mixture in the secondary silencer; and expelling the fluid mixture from the secondary silencer.

56. A method for reducing the acoustic energy of a fluid mixture of a liquid coolant and of exhaust gas from an engine, comprising steps of:

receiving the fluid mixture in a holding chamber of a silencer;

dynamically lifting the fluid mixture above the silencer through a first mixture-expelling conduit disposed at least in part within the holding chamber;

dynamically lifting the fluid mixture above the silencer through a second mixture-expelling conduit disposed at least in part within the holding chamber;

sequentially operating the first and second mixture-expelling conduits;

receiving the fluid mixture from the first and second mixture-expelling conduits in a separator-silencer;

separating the exhaust gas and the liquid coolant from the fluid mixture in the separator-silencer;

reducing the acoustic energy of the separated exhaust gas;

recombining the separated exhaust gas and liquid coolant; and expelling the recombined exhaust gas and liquid coolant from the separator-silencer.

57. A method for reducing the acoustic energy of a fluid mixture of a liquid coolant and of exhaust gas from an engine, comprising steps of:

receiving the fluid mixture in a holding chamber of a silencer;

dynamically lifting the fluid mixture above the silencer through a first mixture-expelling conduit disposed at least in part within the holding chamber;

dynamically lifting the fluid mixture above the silencer through a second mixture-expelling conduit disposed at least in part within the holding chamber;

sequentially operating the first and second mixture-expelling conduits;

receiving the fluid mixture from the first and second mixture-expelling conduits in a separator;

separating the exhaust gas and the liquid coolant from the fluid mixture in the separator;

expelling the separated exhaust gas from the separator-silencer; and expelling the separated liquid coolant from the separator-silencer.

58. A waterlift silencer for reducing the acoustic energy of a fluid mixture of a liquid coolant and of exhaust gas from an engine, comprising:

a holding chamber that holds the fluid mixture;

two or more mixture-expelling conduits constructed and arranged to automatically provide a first total cross-sectional area for the passage of the fluid mixture within a first range of volume flow rates of the exhaust gas into the holding chamber, and a second total cross-sectional area for the passage of the fluid mixture within a second range of volume flow rates of the exhaust gas into the holding chamber, wherein the first total cross-sectional area is less than the second total cross-sectional area and the volume flow rates in the first range are lower than the volume flow rates in the second range.

59. The silencer of claim 58, wherein:

the mixture-expelling conduits are self-compensating.

60. The silencer of claim 58, wherein:

two or more of the two or more conduits are sequentially operative to dynamically lift the fluid mixture above the silencer based on the gas volume flow rate of the exhaust gas into the holding chamber.

61. The silencer of claim 60, wherein:

the number of operative conduits increases as the gas volume flow rate increases.

62. The silencer of claim 58, wherein:

one or more of the mixture-expelling conduits are constructed and arranged to dynamically lift the fluid mixture above the silencer based on combined effects of the exhaust gas volume flow rate and liquid coolant volume flow rate into the holding chamber.

63. A waterlift silencer for reducing the acoustic energy of a fluid mixture of a liquid coolant and of exhaust gas from an engine, comprising:

a holding chamber that holds the fluid mixture;

a first mixture-expelling conduit for expelling the fluid mixture from the holding chamber, the first mixture-expelling conduit having a bottom portion disposed within the holding chamber;

a second mixture-expelling conduit for expelling the fluid mixture from the holding chamber, the second mixture-expelling conduit having a bottom portion disposed within the holding chamber; and means for sequentially operating the first and second mixture-expelling conduits;

the means for sequentially operating is constructed and arranged so that the first mixture-expelling conduit is dynamically operative when the engine is operated within a first range of operating speeds, and the second mixture-expelling conduit is dynamically operative when the engine is operated within a second range of operating speeds having a threshold speed below which the second mixture-expelling conduit is not dynamically operative.

64. A waterlift silencer for reducing the acoustic energy of a fluid mixture of a liquid coolant and of exhaust gas from an engine, comprising:

a holding chamber that holds the fluid mixture;

a first mixture-expelling conduit for expelling the fluid mixture from the holding chamber, the first mixture-expelling conduit having a bottom portion disposed within the holding chamber;

a second mixture-expelling conduit for expelling the fluid mixture from the holding chamber, the second mixture-expelling conduit having a bottom portion disposed within the holding chamber;

means for sequentially operating the first and second mixture-expelling conduits;

the first mixture-expelling conduit has an opening in its bottom portion;

the second mixture-expelling conduit has an opening in its bottom portion; and the means for sequentially operating is constructed and arranged so that the first mixture-expelling conduit is dynamically operative when the exhaust gas has a velocity at the opening of the first mixture-expelling conduit within a first range of exhaust gas flow velocities, and the second mixture-expelling conduit is dynamically operative when the exhaust gas has a velocity at the opening of the first mixture-expelling conduit within a second range of exhaust gas flow velocities including a threshold velocity below which the second mixture-expelling conduit is not dynamically operative.

65. A waterlift silencer for reducing the acoustic energy of a fluid mixture of a liquid coolant and of exhaust gas from an engine, comprising:

a holding chamber that holds the fluid mixture;

a first mixture-expelling conduit for expelling the fluid mixture from the holding chamber, the first mixture-expelling conduit having a bottom portion disposed within the holding chamber;

a second mixture-expelling conduit for expelling the fluid mixture from the holding chamber, the second mixture-expelling conduit having a bottom portion disposed within the holding chamber; and means for sequentially operating the first and second mixture-expelling conduits; and the means for sequentially operating is constructed and arranged so that the first mixture-expelling conduit is dynamically operative within a first range of static gas pressures in the holding chamber, and the second mixture-expelling conduit is dynamically operative within a second range of static gas pressures in the holding chamber, including a threshold static gas pressure below which the second mixture-expelling conduit is not dynamically operative.

66. A waterlift silencer for reducing the acoustic energy of a fluid mixture of a liquid coolant and of exhaust gas from an engine comprising:

a holding chamber that holds the fluid mixture;

a first mixture-expelling conduit for expelling the fluid mixture from the holding chamber, the first mixture-expelling conduit having a bottom portion disposed within the holding chamber;

a second mixture-expelling conduit for expelling the fluid mixture from the holding chamber, the second mixture-expelling conduit having a bottom portion disposed within the holding chamber;

means for sequentially operating the first and second mixture-expelling conduits;

the bottom portion of the first mixture-expelling conduit has an opening;

the bottom portion of the second mixture-expelling conduit has an opening; and the means for sequentially operating is constructed and arranged so that the first mixture-expelling conduit is dynamically operative within a first range of dynamic gas pressures at the opening of the bottom portion of the first mixture-expelling conduit, and the second mixture-expelling conduit is dynamically operative within a second range of dynamic gas pressures at the opening of the bottom portion of the first mixture-expelling conduit, including a threshold dynamic gas pressure below which the second mixture-expelling conduit is not dynamically operative.

67. A waterlift silencer for reducing the acoustic energy of a fluid mixture of a liquid coolant and of exhaust gas from an engine, comprising:

a holding chamber that holds the fluid mixture;

a first mixture-expelling conduit for expelling the fluid mixture from the holding chamber, the first mixture-expelling conduit having a bottom portion disposed within the holding chamber;

a second mixture-expelling conduit for expelling the fluid mixture from the holding chamber the second mixture-expelling conduit having a bottom portion disposed within the holding chamber;

means for sequentially operating the first and second mixture-expelling conduits; and the means for sequentially operating is constructed and arranged so that the first mixture-expelling conduit is dynamically operative when a first range of back pressure is present at the engine, and the second mixture-expelling conduit is dynamically operative when a second range of back pressure is present at the engine, including a threshold back pressure below which the second mixture-expelling conduit is not dynamically operative.

68. The silencer of claim 67, wherein:

the first and second ranges are selected so that each value of back pressure within both ranges is substantially within normal back pressure operating limits for the engine at its normal engine operating speeds.

69. A waterlift silencer for reducing the acoustic energy of a fluid mixture of a liquid coolant and of exhaust gas from an engine comprising:

a holding chamber that holds the fluid mixture;

a first mixture-expelling conduit for expelling the fluid mixture from the holding chamber, the first mixture-expelling conduit having a bottom portion disposed within the holding chamber;

a second mixture-expelling conduit for expelling the fluid mixture from the holding chamber, the second mixture-expelling conduit having a bottom portion disposed within the holding chamber;

means for sequentially operating the first and second mixture-expelling conduits; and the means for sequentially operating is constructed and arranged so that the first mixture-expelling conduit is dynamically operative when the liquid coolant has a volume flow rate into the holding chamber that is within a first range of flow rates, and the second mixture-expelling conduit is dynamically operative when the liquid coolant has a volume flow rate into the holding chamber that is within a second range of flow rates including a threshold flow rate below which the second mixture-expelling conduit is not dynamically operative.

70. A waterlift silencer for reducing the acoustic energy of a fluid mixture of a liquid coolant and of exhaust gas from an engine, comprising:

a holding chamber that holds the fluid mixture;

a first mixture-expelling conduit for expelling the fluid mixture from the holding chamber the first mixture-expelling conduit having a bottom portion disposed within the holding chamber;

a second mixture-expelling conduit for expelling the fluid mixture from the holding chamber the second mixture-expelling conduit having a bottom portion disposed within the holding chamber; and means for sequentially operating the first and second mixture-expelling conduits; and the means for sequentially operating is constructed and arranged so that the first mixture-expelling conduit is dynamically operative when the exhaust gas has a volume flow rate into the holding chamber that is within a first range of flow rates, and the second mixture-expelling conduit is dynamically operative when the exhaust gas has a volume flow rate into the holding chamber that is within a second range of flow rates including a threshold flow rate below which the second mixture-expelling conduit is not dynamically operative.

71. A waterlift silencer for reducing the acoustic energy of a fluid mixture of a liquid coolant and of exhaust gas from an engine comprising:

a holding chamber that holds the fluid mixture;

a first mixture-expelling conduit for expelling the fluid mixture from the holding chamber, the first mixture-expelling conduit having a bottom portion disposed within the holding chamber;

a second mixture-expelling conduit for expelling the fluid mixture from the holding chamber, the second mixture-expelling conduit having a bottom portion disposed within the holding chamber;

means for sequentially operating the first and second mixture-expelling conduits; and the means for sequentially operating is constructed and arranged so that the first mixture-expelling conduit is dynamically operative in response to combined effects of a first plurality of sets of values of liquid coolant volume flow rate and exhaust gas volume flow rate into the holding chamber, and the second mixture-expelling conduit is dynamically operative in response to combined effects of a second plurality of sets of values of liquid coolant volume flow rate and exhaust gas volume flow rate into the holding chamber, wherein at least one of the first plurality of sets of values is not the same as any of the second plurality of sets of values and wherein at least one of the second plurality of sets of values is the same as one of the first plurality of sets of values.

* * * * *

UNITED STATES PATENT AND TRADEMARK OFFICE
CERTIFICATE OF CORRECTION

PATENT NO. : 6,273,772 B1
DATED : August 14, 2001
INVENTOR(S) : Joseph I. Smullin It is certified that error appears in the above-identified patent and that said Letters Patent is hereby corrected as shown below:

Column 33, claim 38,
Line 3, replace "and" with -- any --.

Column 35, claim 44,
Line 11, replace "quid" with -- liquid --.

Column 38, claim 51,
Line 16, replace "Dart" with -- part --.

Signed and Sealed this

Twelfth Day of March, 2002

Attest:

JAMES E. ROGAN
*Attesting Officer*  *Director of the United States Patent and Trademark Office*